(12) United States Patent
Misenheimer

(10) Patent No.: US 12,089,540 B2
(45) Date of Patent: Sep. 17, 2024

(54) BACKPACK BLOWER CONVERTER ATTACHMENT

(71) Applicant: Justin Misenheimer, Lawrenceville, GA (US)

(72) Inventor: Justin Misenheimer, Lawrenceville, GA (US)

(*) Notice: Subject to any disclaimer, the term of this patent is extended or adjusted under 35 U.S.C. 154(b) by 0 days.

(21) Appl. No.: 17/478,334

(22) Filed: Sep. 17, 2021

(65) Prior Publication Data

US 2023/0085931 A1 Mar. 23, 2023

(51) Int. Cl.
| | |
|---|---|
| *A01G 20/47* | (2018.01) |
| *A45F 3/00* | (2006.01) |
| *A45F 3/04* | (2006.01) |
| *B23P 6/00* | (2006.01) |

(52) U.S. Cl.
CPC .............. *A01G 20/47* (2018.02); *A45F 3/04* (2013.01); *B23P 6/00* (2013.01); *A45F 2003/003* (2013.01); *Y10T 29/49716* (2015.01)

(58) Field of Classification Search
CPC ...... A01G 20/47; B23P 6/00; Y10T 29/49716
See application file for complete search history.

(56) References Cited

U.S. PATENT DOCUMENTS

| | | | | |
|---|---|---|---|---|
| 6,928,693 | B1* | 8/2005 | Ericson | A47L 5/14 |
| | | | | 15/327.5 |
| 7,600,290 | B1* | 10/2009 | Peters | A47L 5/36 |
| | | | | 15/327.5 |
| 8,177,914 | B2* | 5/2012 | Peters | E01H 1/0809 |
| | | | | 15/327.5 |
| 8,671,516 | B1* | 3/2014 | Mendez | A01G 20/47 |
| | | | | 15/327.5 |
| 10,165,738 | B2* | 1/2019 | Haramoto | F04D 25/0673 |
| 2013/0312213 | A1* | 11/2013 | Takahashi | E01H 1/0809 |
| | | | | 15/327.5 |
| 2017/0273251 | A1* | 9/2017 | Haramoto | F04D 25/16 |
| 2018/0206620 | A1* | 7/2018 | Yamaoka | A47L 5/14 |
| 2020/0383281 | A1* | 12/2020 | Zhou | A01G 20/47 |
| 2022/0124989 | A1* | 4/2022 | Peters | A01G 20/47 |

* cited by examiner

*Primary Examiner* — Jason L Vaughan
(74) *Attorney, Agent, or Firm* — Incorporating Innovation LLC; Charlena Thorpe, Esq.

(57) ABSTRACT

Implementations of a backpack blower converter attachment are provided. In some implementations, the backpack blower converter attachment comprises a converter tube and may further comprise one or more tube couplings, securing straps, and/or a replacement tube elbow. In some implementations, a method of using the backpack blower converter attachment comprises disconnecting the blower tube from the blower tube elbow of a backpack blower and connecting the converter tube to the blower tube elbow and the blower tube of the backpack blower.

19 Claims, 19 Drawing Sheets

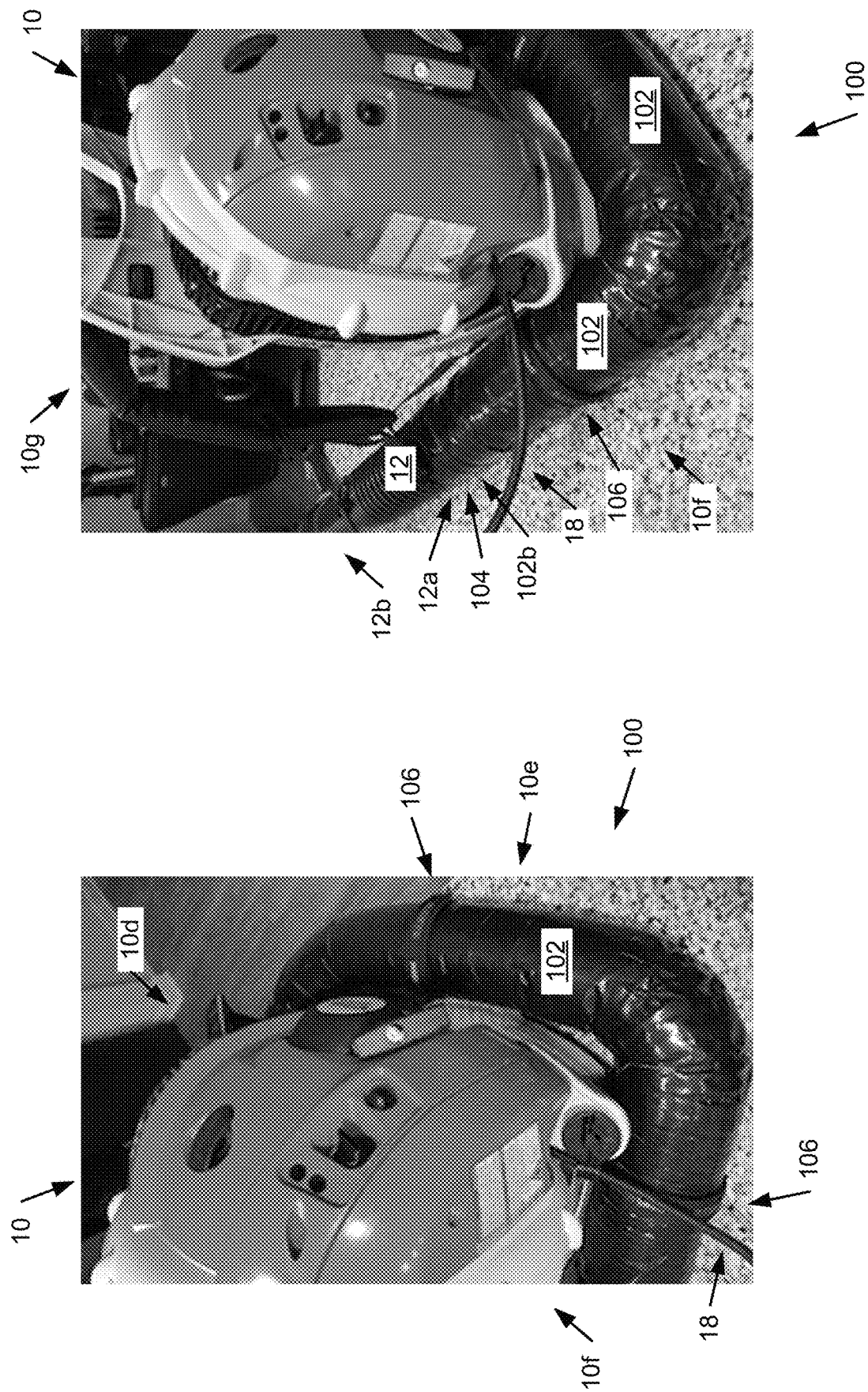

BACKPACK BLOWER CONVERTER ATTACHMENT

TECHNICAL FIELD

This disclosure relates to implementations of a backpack blower converter attachment.

BACKGROUND

As shown in FIG. 1A, existing backpack blowers are designed for right-handed use to blow leaves or other debris for landscaping or similar purposes. However, a user's right hand, arm, etc. can easily become tired, sore, or otherwise uncomfortable from the right-handed only use of the backpack blower. For example, the user can become tired, sore, or otherwise uncomfortable while holding and aiming the blower tube, which usually involves frequent or continuous motion. In such instances, the user usually needs to stop using the backpack blower to rest, which results in inefficient, unproductive downtime.

The right-handed only use of the backpack blower can also be uncomfortable or awkward when the user has to reach the user's right arm across the user's body to hold the aim of the blower tube toward the user's left side, such as to blow leaves or other debris along a fence or wall to the left of the user. Furthermore, it is usually awkward or otherwise difficult for left-handed users to use the backpack blowers because of the right-handed use design.

BRIEF DESCRIPTION OF THE DRAWINGS

FIGS. 2A-2E illustrate various views of an implementation of an example backpack blower converter attachment connected to an existing backpack blower according to the present disclosure.

DETAILED DESCRIPTION

Figure 1B:
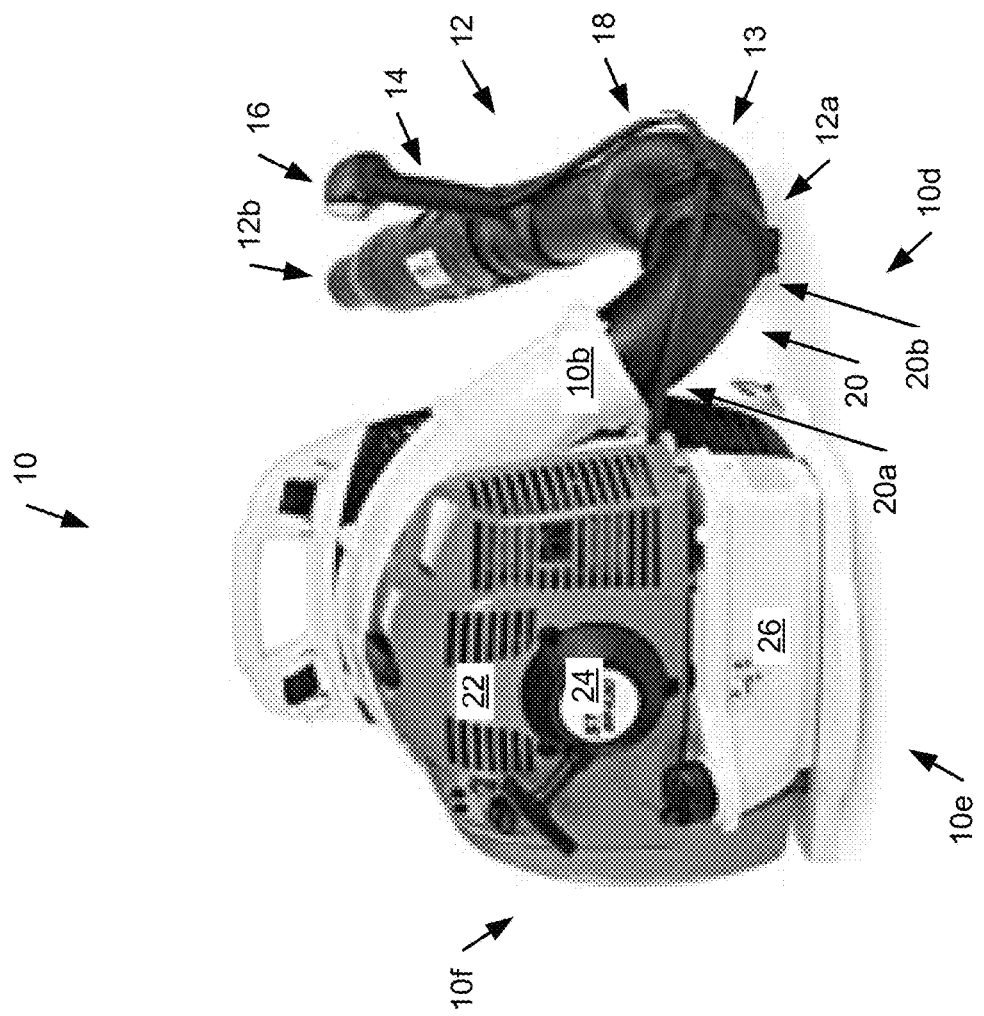
FIG. 1B further illustrates an example existing backpack blower.

Implementations of a backpack blower converter attachment are provided. In some implementations, the backpack blower converter attachment comprises a converter tube. In some implementations, the backpack blower converter attachment further comprises one or more tube couplings or connectors (e.g., "quick connect clamps").

In some implementations, the backpack blower converter attachment further comprises one or more tube securing straps. In some implementations, the backpack blower converter attachment further comprises one or more cable securing straps (e.g., "snug fittings", not shown). In some implementations, the backpack blower converter attachment further comprises a replacement tube elbow.

In some implementations, the backpack blower converter attachment is configured to convert an existing backpack blower from the usual right-handed only use configuration to a left-handed use configuration. In some implementations, the backpack blower converter attachment is configured to quickly convert the existing backpack blower. In some implementations, the backpack blower converter attachment is configured to expediently convert the existing backpack blower, e.g. with little or no additional changes or preparation to the blower.

In some implementations, the backpack blower converter attachment is configured to position the blower tube of an existing backpack blower on the left side of the backpack blower to be held and aimed with a user's left hand.

In some implementations, the backpack blower converter attachment is configured to securely connect between the blower tube elbow and the blower tube of an existing backpack blower. In some implementations, the backpack blower converter attachment is configured to thereby position the blower tube on the left side of the backpack blower.

In some implementations, the backpack blower converter attachment is configured to removably connect between the blower tube elbow and the blower tube of an existing backpack blower.

In some implementations, the backpack blower converter attachment is further configured to replace the blower tube elbow and connect between the blower output port and the blower tube of an existing backpack blower.

In some implementations, the backpack blower converter attachment is configured to securely attach to an existing backpack blower. In some implementations, the backpack blower converter attachment is configured to removably attach to the existing backpack blower.

In this way, in some implementations, the backpack blower converter attachment allows a user to alternate to a left-handed use of an existing backpack blower to avoid having to rest when the user's right hand, arm, etc. becomes tired, sore, or otherwise uncomfortable and thereby avoids inefficient, unproductive downtime of the user.

Also, in this way, in some implementations, the backpack blower converter attachment avoids user discomfort or awkwardness when the user has to hold the aim of the blower tube toward the user's left side, such as to blow leaves or other debris along a fence or wall to the left of the user.

Furthermore, in this way, in some implementations, the backpack blower converter attachment allows a left-handed user to use an existing backpack blower converted to a left-handed use configuration with the backpack blower converter attachment to avoid awkwardness or other usual difficulty during use.

In some implementations, the backpack blower converter attachment may be further configured to extend and compress lengthwise and also flexibly bend (e.g., laterally).

Furthermore, in some implementations, the backpack blower converter attachment may be further configured to allow the conversion back to a normally right-handed (or left-handed) only use configuration from the converted left-handed (or right-handed) use configuration while keeping the backpack blower converter attachment attached and in use to the backpack blower.

In some implementations, a method of using the backpack blower converter attachment comprises disconnecting the blower tube from the blower tube elbow of an existing backpack blower. In some implementations, the method comprises connecting a converter tube of the backpack blower converter attachment to the blower tube elbow of the existing backpack blower.

In some implementations, the method comprises positioning the converter tube along the right side, the back side, and the left side of the existing backpack blower. In some implementations, the method comprises connecting the blower tube to the converter tube, thereby positioning the blower tube on the left side of the existing backpack blower to convert the existing backpack blower from a usual right-handed only use configuration to a left-handed use configuration.

Figure 1A:
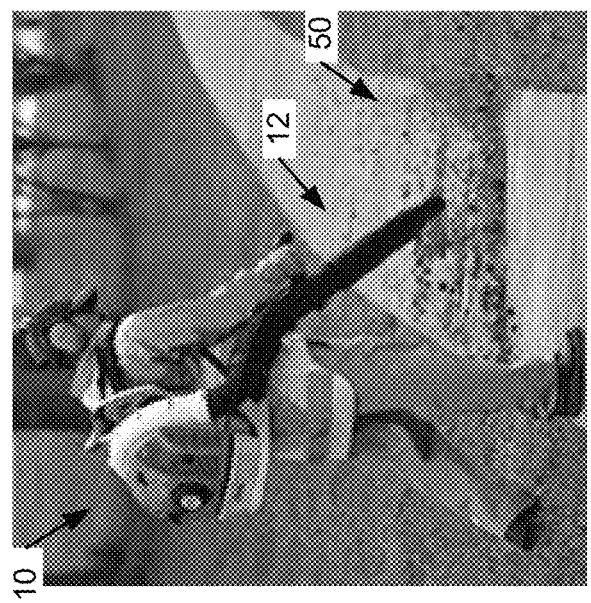
FIG. 1A illustrates an example right-handed only use of an existing backpack blower.

FIG. 1A illustrates an example right-handed only use of an existing backpack blower 10. As shown in FIG. 1A, existing backpack blowers 10 are designed for right-handed use to blow leaves or other debris 50 for landscaping or similar purposes. However, a user's right hand, arm, etc. can easily become tired, sore, or otherwise uncomfortable from the right-handed only use of the backpack blower 10.

For example, the user can become tired, sore, or otherwise uncomfortable while holding and aiming the blower tube 12 (described below), which usually involves frequent or continuous motion. In such instances, the user usually needs to stop using the backpack blower 10 to rest, which results in inefficient, unproductive downtime.

The right-handed only use of the backpack blower 10 can also be uncomfortable or awkward when the user has to reach the user's right arm across the user's body to hold the aim of the blower tube 12 toward the user's left side, such as to blow leaves or other debris along a fence or wall to the left of the user. Furthermore, it is usually awkward or otherwise difficult for left-handed users to use the backpack blowers 10 because of the right-handed use design.

FIG. 1B further illustrates an example existing backpack blower 10. Such existing backpack blowers 10 include several components that are or may be involved in the installation and/or use of a backpack blower converter attachment according to the present disclosure as described herein. These components include a blower output port 10b, a blower right side 10d, a blower back side 10e, a blower left side 10f, a blower front side 10g, and a blower tube 12 (introduced above). These components also include a blower tube handle 14, a tube-mounted throttle control 16, a throttle control cable 18, a blower tube elbow 20, a cover 22, a pull-starter assembly 24, and a fuel container 26.

As shown in FIG. 1B, the components may also include a pleated hose 13 that is part of and/or connected to the blower tube 12 and also connected to the blower tube elbow 20. The pleated hose 13 is generally rigid such that it does not extend or compress lengthwise so cannot increase or decrease in length. The pleated hose 13 is generally semi-rigid such that it can partially bend laterally to allow a user to aim the blower tube 12 to blow leaves or other debris. For example, the pleated hose 13 may be generally the same as rigid plastic corrugated pipe (e.g., corrugated drainage pipe).

As shown in FIG. 1B, the blower tube 12 (e.g., with or without the pleated hose portion 13) includes an input opening 12a in through which air flows during operation of the backpack blower 10. The blower tube 12 also includes an output opening 12b out of which air flows during operation of the backpack blower 10 to blow leaves or other debris.

As shown in FIG. 1B, the blower tube handle 14 is attached to the blower tube 12. As shown in FIG. 1A, the blower tube handle 14 allows a user of the backpack blower 10 to hold and aim the blower tube 12 to blow leaves or other debris.

As shown in FIG. 1B, the tube-mounted throttle control 16 is attached or otherwise integrated to the blower handle 14. The throttle control 16 allows a user to adjust the operating speed of the backpack blower 10 to thereby increase or decrease the force of the air blown through the blower tube output opening 12b.

As shown in FIG. 1B, the throttle control cable 18 is attached to the throttle control 16 and the backpack blower motor (not shown) under the cover 22. The throttle control cable 18 functionally connects the throttle control 16 and the backpack blower motor together.

As shown in FIG. 1B, the blower tube elbow 20 includes an input opening 20a and an output opening 20b. The blower tube elbow 20 connects between the backpack blower output port 10b and the blower tube input opening 12a at the elbow openings 20a, 20b respectively. This connection of the blower tube elbow 20 thereby allows air to flow from the backpack blower turbine or pump (not shown), under the cover 22, to the blower tube 12 during operation of the backpack blower 10.

As shown in FIG. 1B, the blower tube elbow 20 is usually a rigid tube segment with an approximate ninety degree bend to transition from a substantially vertical connection to the blower output port 10b to a substantially horizontal connection to the blower tube input opening 12a. The blower tube elbow 20 is also usually rotateably connected to the blower output port 10b so that the blower tube elbow output opening 20b is rotateable between a substantially forward facing direction toward the blower front side 10g and a substantially rearward facing direction toward the blower back side 10e (i.e., approximately one-hundred eighty degrees of rotation).

In some implementations, with respect to the present disclosure, the existing backpack blower 10 may be a Stihl® BR 600® backpack blower. In some implementations, the existing backpack blower 10 may be any other suitable backpack blower.

Figure 2B:
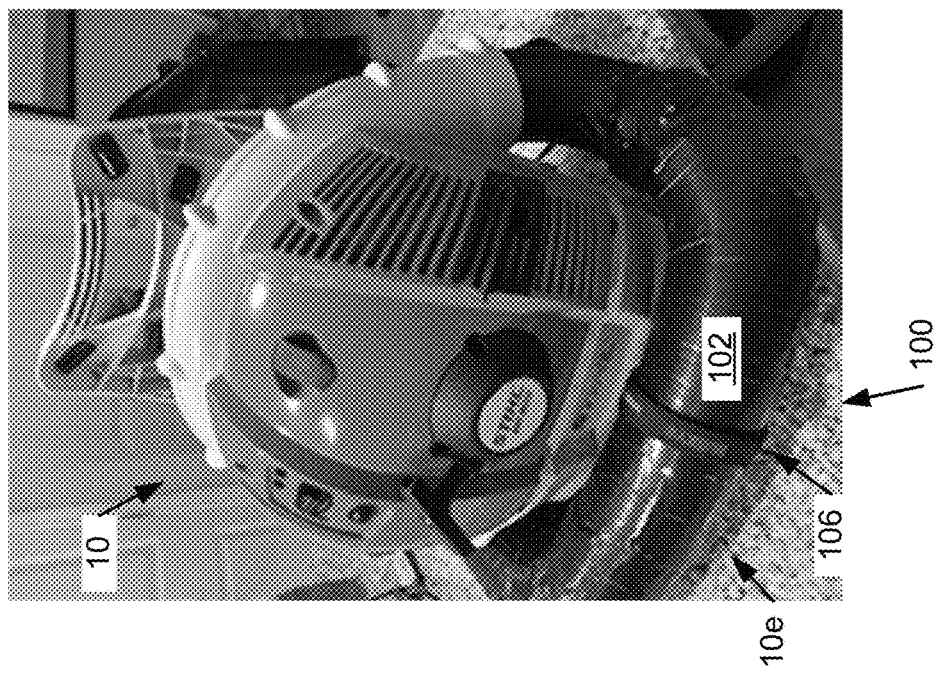
Figure 2A:
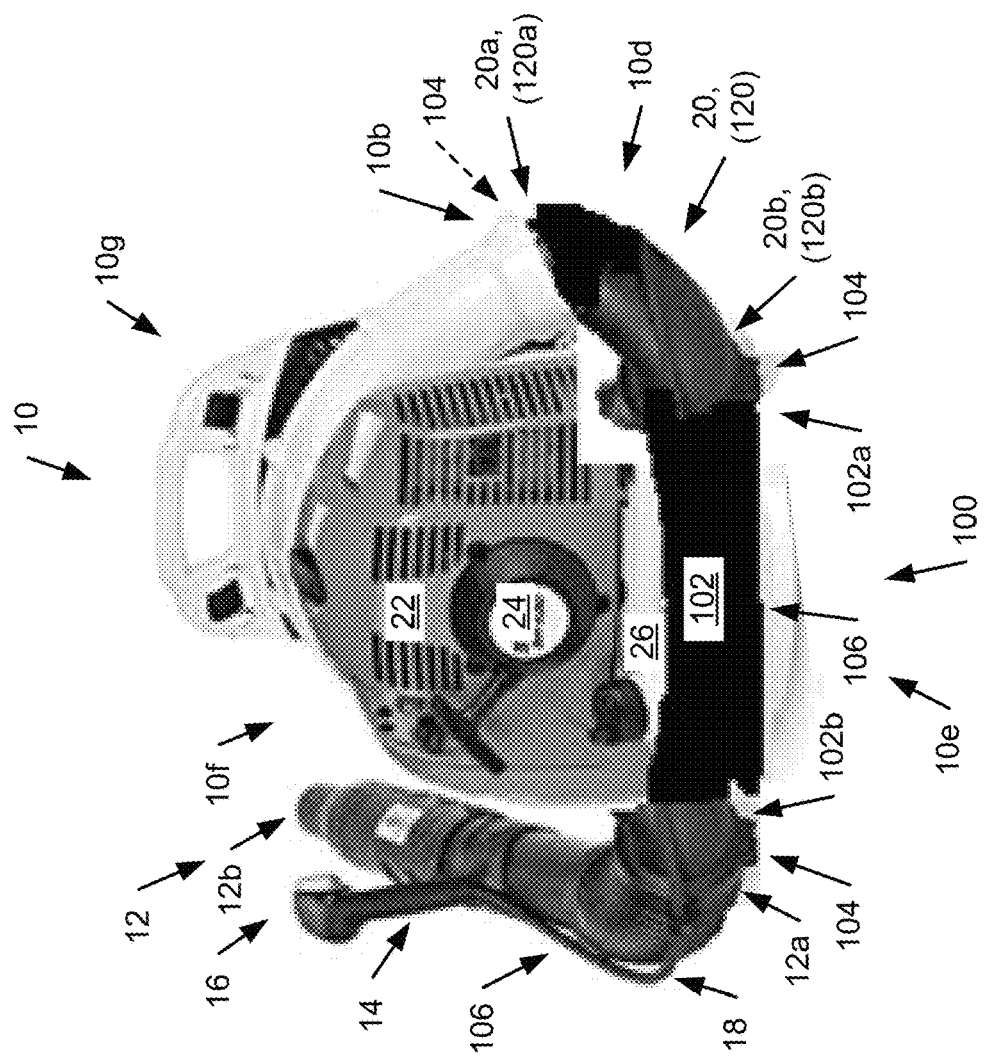

FIGS. 2A-2E illustrate various views of an implementation of an example backpack blower converter attachment 100 connected to an existing backpack blower 10 according to the present disclosure. As shown in FIG. 2A, in some implementations, the backpack blower converter attachment 100 comprises a converter tube 102. In some implementations, the backpack blower converter attachment 100 further comprises one or more tube couplings or connectors 104 (e.g., "quick connect clamps").

In some implementations, the backpack blower converter attachment 100 further comprises one or more tube securing straps 106. In some implementations, the backpack blower converter attachment 100 further comprises one or more cable securing straps (e.g., "snug fittings", not shown). In some implementations, the backpack blower converter attachment 100 further comprises a replacement tube elbow 120.

As shown in FIG. 2A, in some implementations, the converter tube 102 comprises an input opening 102a and an output opening 102b.

In some implementations, the converter tube 102 is tubular. In some implementations, the converter tube 102 is elongated. In some implementations, the converter tube 102 is at least partly and/or substantially U-shaped. In some implementations, the converter tube 102 may have any other suitable shape features.

In some implementations, the converter tube 102 may comprise any suitable configuration. For example, in some implementations, the converter tube 102 may be generally rigid, such as the "hard pipe" configuration described below for FIGS. 3A-3D.

In some implementations, the converter tube 102 may be flexible or semi-rigid. For example, in some implementations, the converter tube 102 may comprise a pleated configuration, such as similar to the flexible portion (e.g., the pleated hose 13) of a blower tube 12. In some implementations, the converter tube 102 may comprise a more flexible accordion configuration, such as similar to the accordion-style converter tube 102D described below for FIGS. 6A-6E.

In some implementations, the converter tube 102 is configured to connect between the blower tube elbow 20 and the blower tube 12 of an existing backpack blower 10, described above for FIGS. 1A and 1B. In some implementations, the converter tube input opening 102a is configured to connect to the blower tube elbow output opening 20b. In some implementations, the converter tube output opening 102b is configured to connect to the blower tube input opening 12a. In some implementations, the converter tube 102 is configured to connect between the blower tube elbow 20 and the blower tube 12 in any other suitable configuration.

As shown in FIG. 2A, in some implementations, the converter tube 102 is configured to connect to the blower tube elbow 20 on the right side 10d of the backpack blower 10. In some implementations, the converter tube 102 is configured to connect to the blower tube elbow 20 rotated so that the elbow output opening 20b is substantially rearward facing, i.e. toward the back side 10e of the backpack blower 10.

In some implementations, the converter tube 102 is configured to extend from the connection to the blower tube elbow 20 along the blower right side 10d, along the blower back side 10e, and along the blower left side 10f. As shown in FIG. 2D, in some implementations, the converter tube 102 is configured to so extend so that the output opening 102b is substantially forward facing on the blower left side 10f, i.e. facing the direction of the blower front side 10g.

As shown in FIG. 2D, in some implementations, the converter tube 102 is configured to connect to the blower tube 12 while positioned on the blower left side 10f.

Figure 2E:
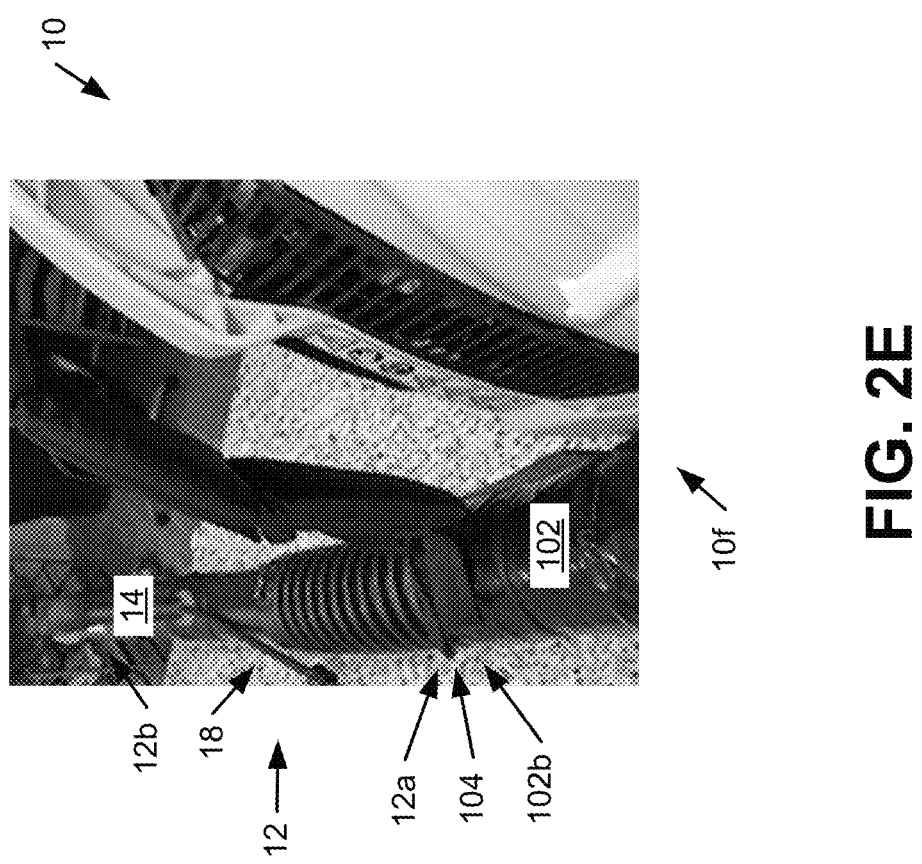

In some implementations, the foregoing connections and extension of the converter tube 102 thereby converts the backpack blower 10 from the usual right-handed only use configuration to a left-handed use configuration. For example, as shown in FIGS. 2D and 2E, in some implementations, the foregoing connection and extension of the converter tube 102 thereby positions the blower tube 12 on the blower left side 10f to be held and aimed with a user's left hand.

In some implementations, this converted left-handed use configuration mirrors the right-handed use configuration. For example, in some implementations, the converter tube 102 is configured to allow the blower tube 12 to extend from an existing backpack blower 10 in the left-handed use configuration in a similar distance and manner as when connected in the right-handed use configuration.

In some implementations, the converter tube 102 is configured to removably connect between the blower tube elbow 20 and the blower tube 12.

As introduced above, in some implementations, the backpack blower converter attachment 100 further comprises one or more tube couplings 104. For example, as shown in FIG. 2A, in some implementations, the backpack blower converter attachment 100 comprises a tube coupling 104 at the connection between the converter tube 102 and the blower tube elbow 20. In some implementations, the backpack blower converter attachment 100 comprises another tube coupling 104 at the connection between the converter tube 102 and the blower tube 12.

In some implementations, the backpack blower converter attachment 100 may comprise one or more other tube couplings 104 at any other suitable connections of the backpack blower converter attachment 100 respectively.

Figure 3A:
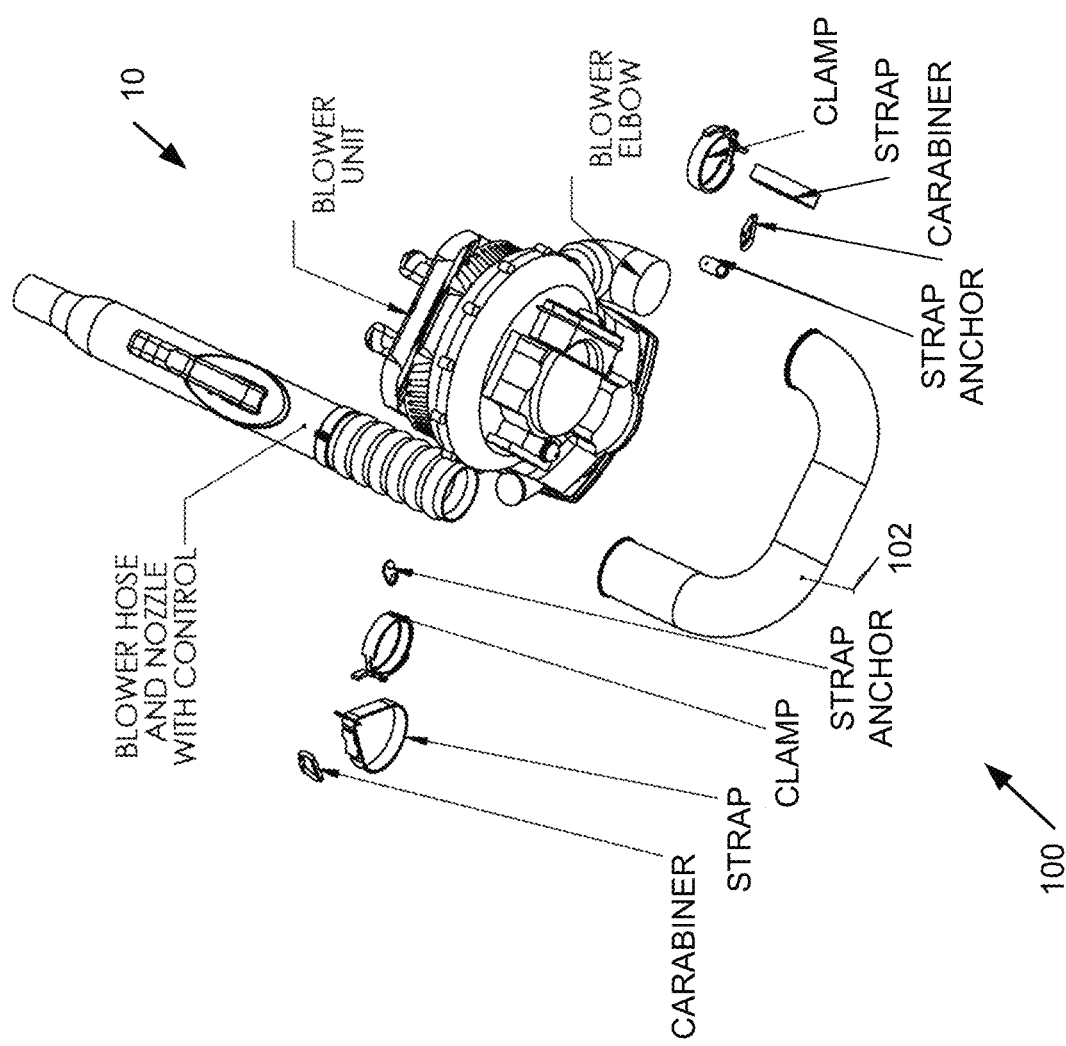
FIGS. 3A-3I illustrate various manufacturing or production representations of the backpack blower converter attachment according to the present disclosure.
Figure 3B:
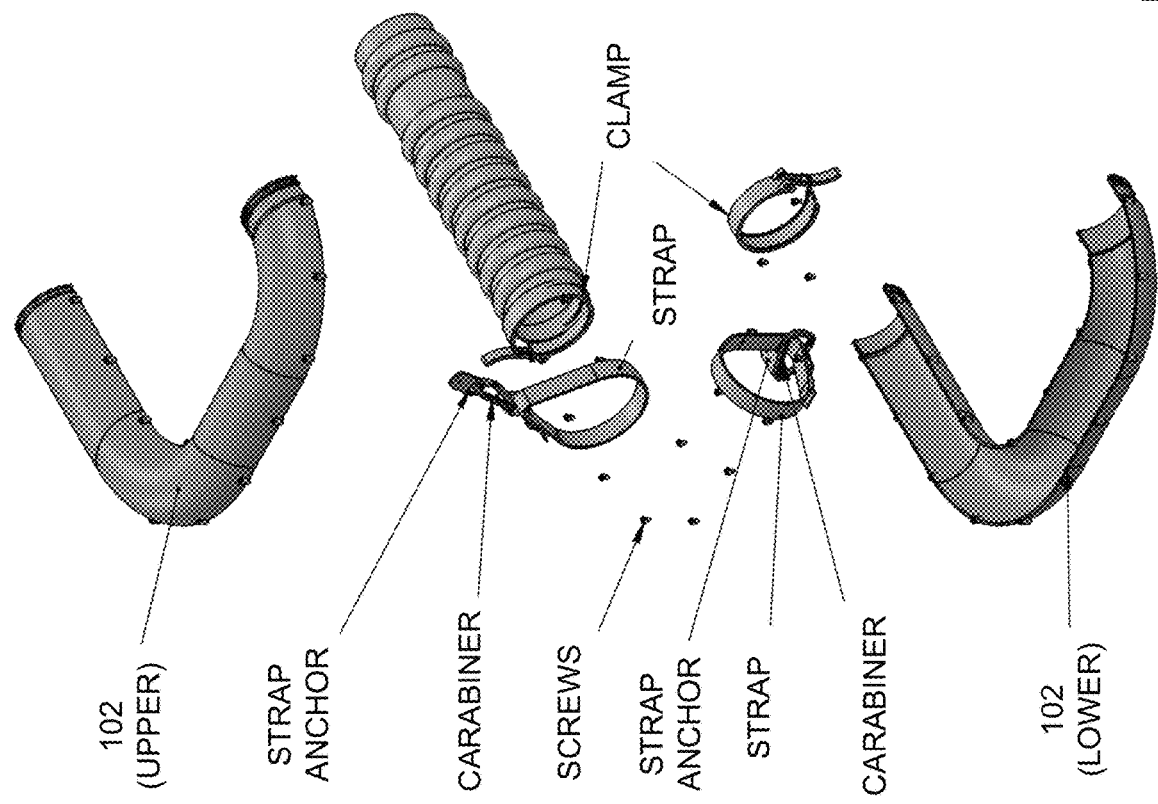
Figure 3C:
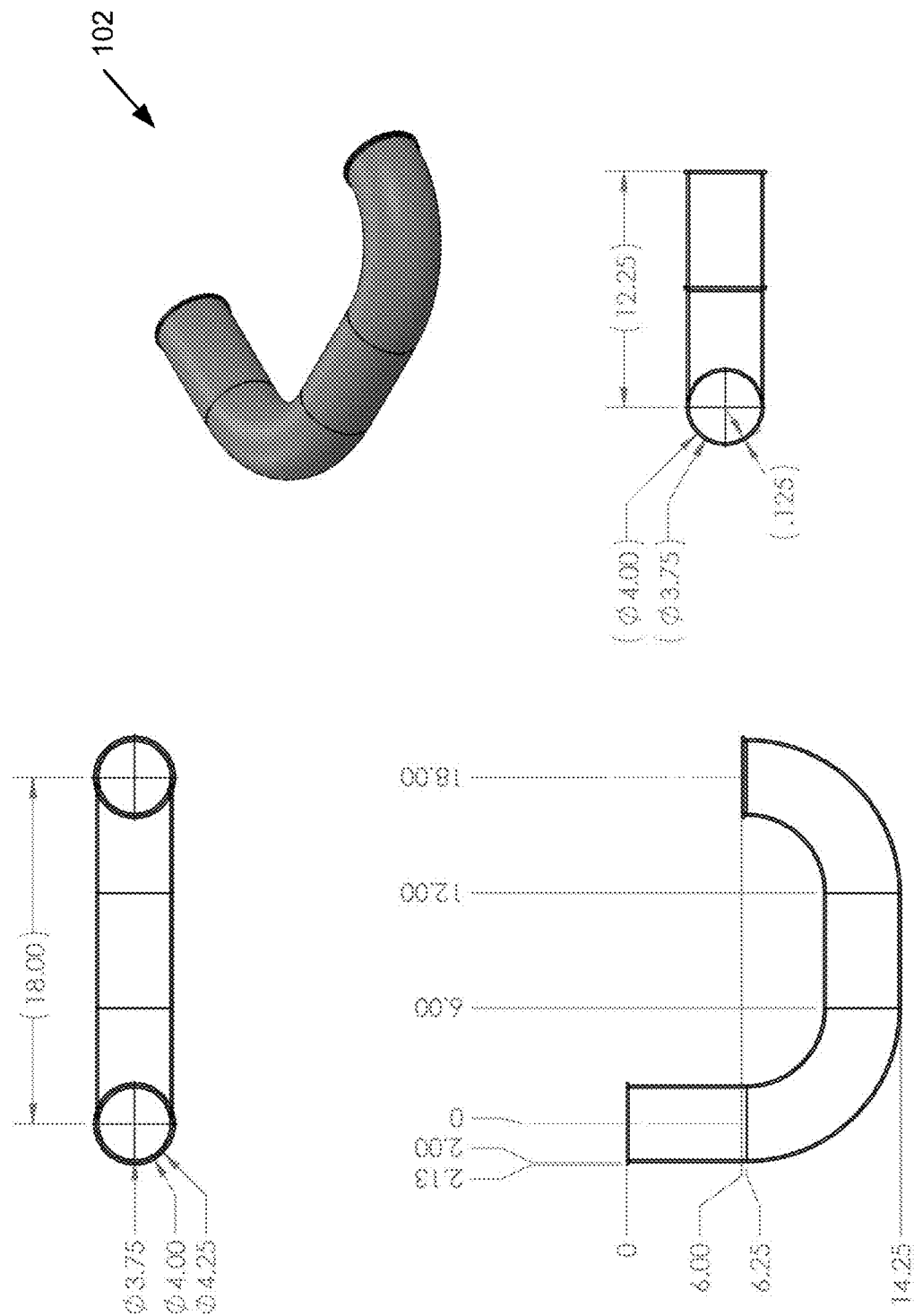
Figure 3D:
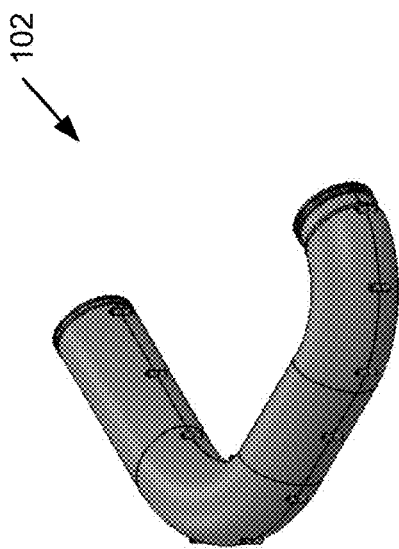
Figure 3D:
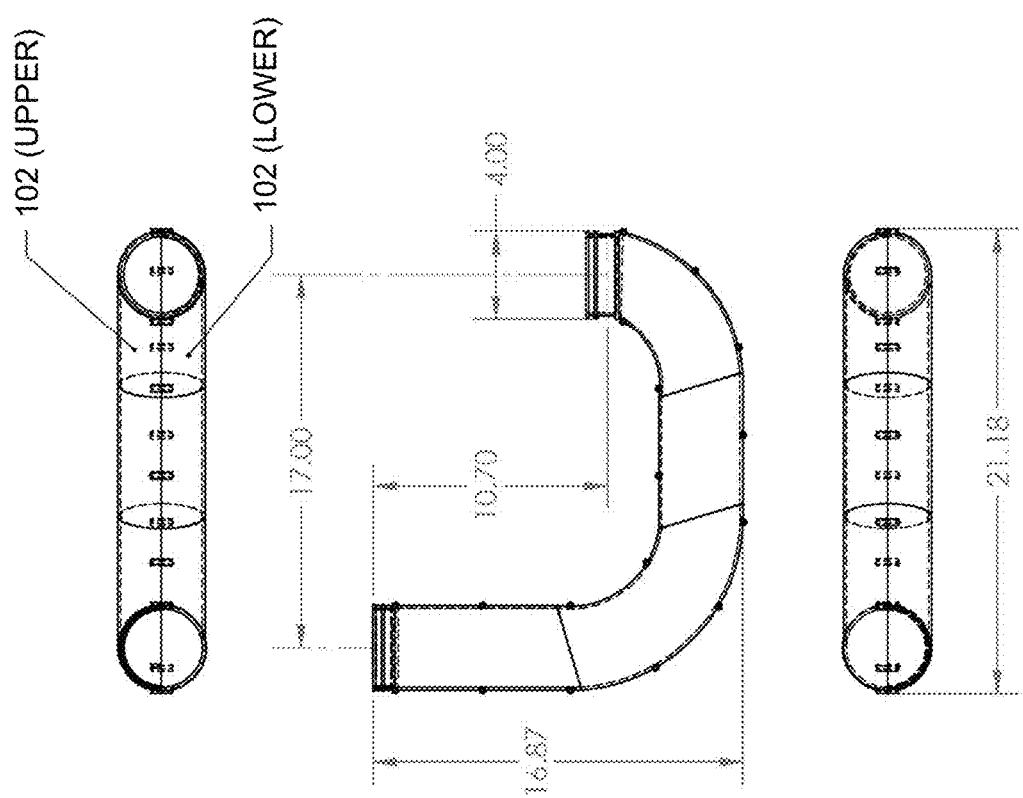
Figure 3E:
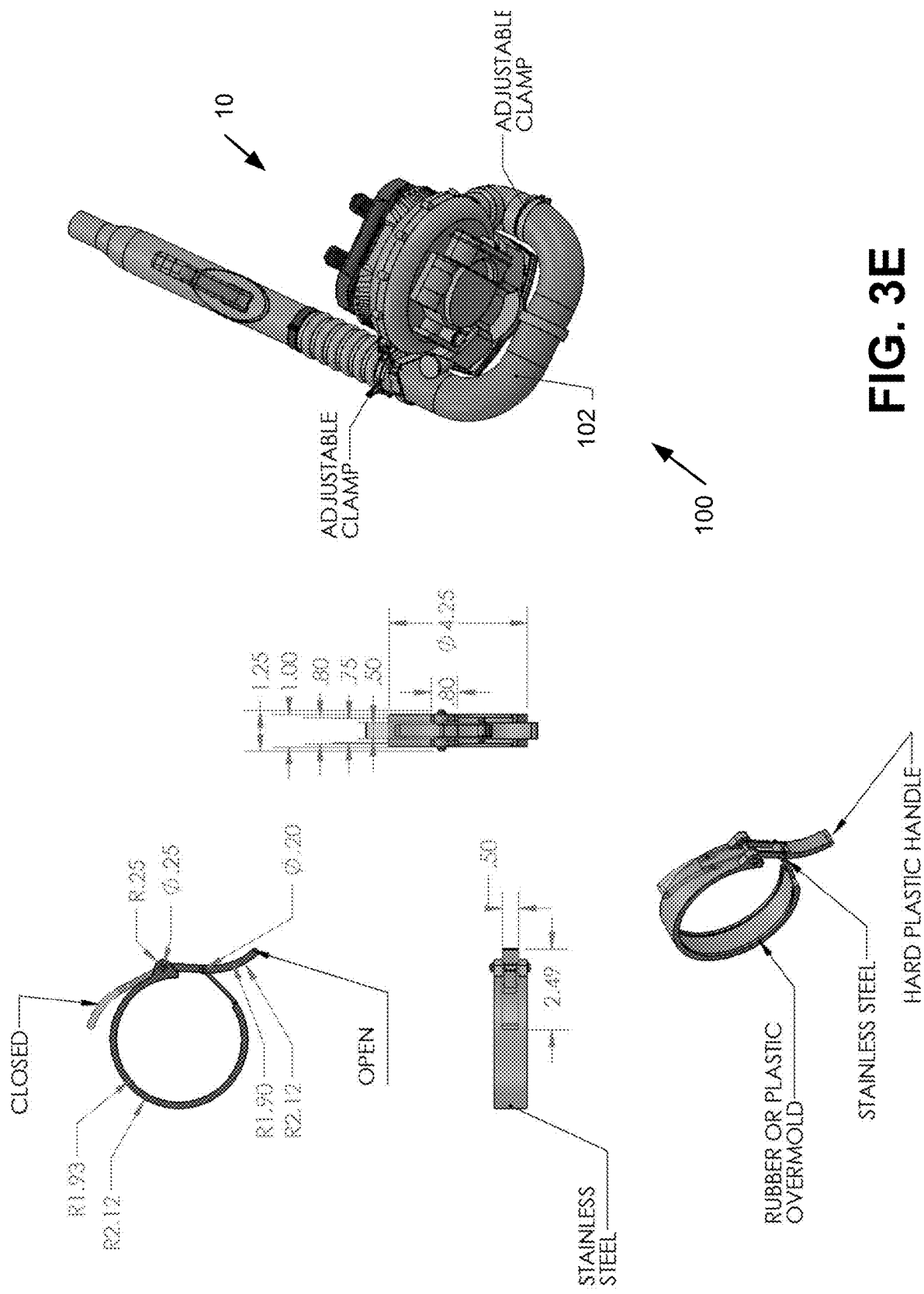
Figure 3F:
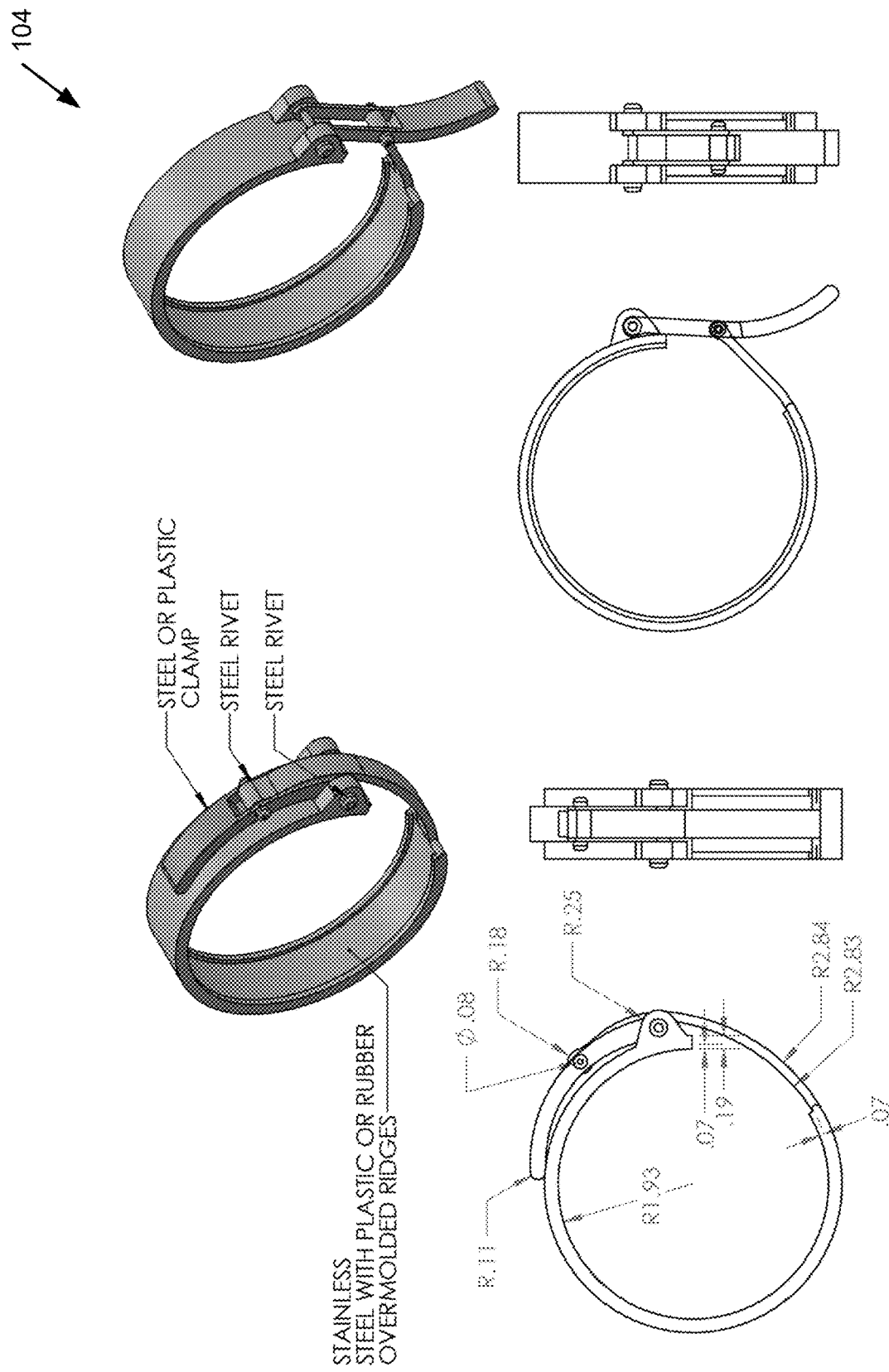

In some implementations, the tube couplings 104 may comprise any suitable tube couplings or similar component. For example, in some implementations, the tube couplings 104 may comprise an adjustable quick release pipe clamp or similar component such as shown in FIGS. 3E and 3F.

In some implementations, the tube couplings 104 are configured to securely connect the backpack blower converter attachment 100 to the backpack blower 10, such as by the connections described above. In some implementations, the tube couplings 104 are configured to removably connect the backpack blower converter attachment 100 to the backpack blower 10. In some implementations, the tube couplings 104 are configured to connect the backpack blower converter attachment 100 to the backpack blower 10 in any other suitable manner.

In some implementations, the tube couplings 104 are configured to be expandable or otherwise adjustable, for example in diameter or other parameter. In some implementations, the tube couplings 104 are configured to be expandable or otherwise adjustable to securely, removably, and/or otherwise connect the backpack blower converter attachment 100 to the backpack blower 10.

In some implementations, the tube couplings 104 may be adjustable to fit the connection to one or more types, brands, models, or other applicable variety of backpack blowers 10.

In some implementations, the tube coupling 104 is configured to securely, removably, and/or otherwise connect the blower tube 12 to the blower tube elbow 20, for example to reconnect the backpack blower 10 in the original right-handed use configuration when the backpack blower converter attachment 100 is not connected.

As introduced above, in some implementations, the backpack blower converter attachment 100 further comprises one or more tube securing straps 106. For example, as shown in FIG. 2B, in some implementations, the backpack blower converter attachment 100 comprises a tube securing strap 106 that secures the converter tube 102 to the blower back side 10e. As shown in FIG. 2C, in some implementations, the backpack blower converter attachment 100 comprises another tube securing strap 106 that secures the converter tube 102 to the blower left side 10f.

In some implementations, the backpack blower converter attachment 100 may comprise one or more other tube securing straps 106 that secure the converter tube 102 to any other suitable location on the backpack blower 10 respectively.

Figure 3G:
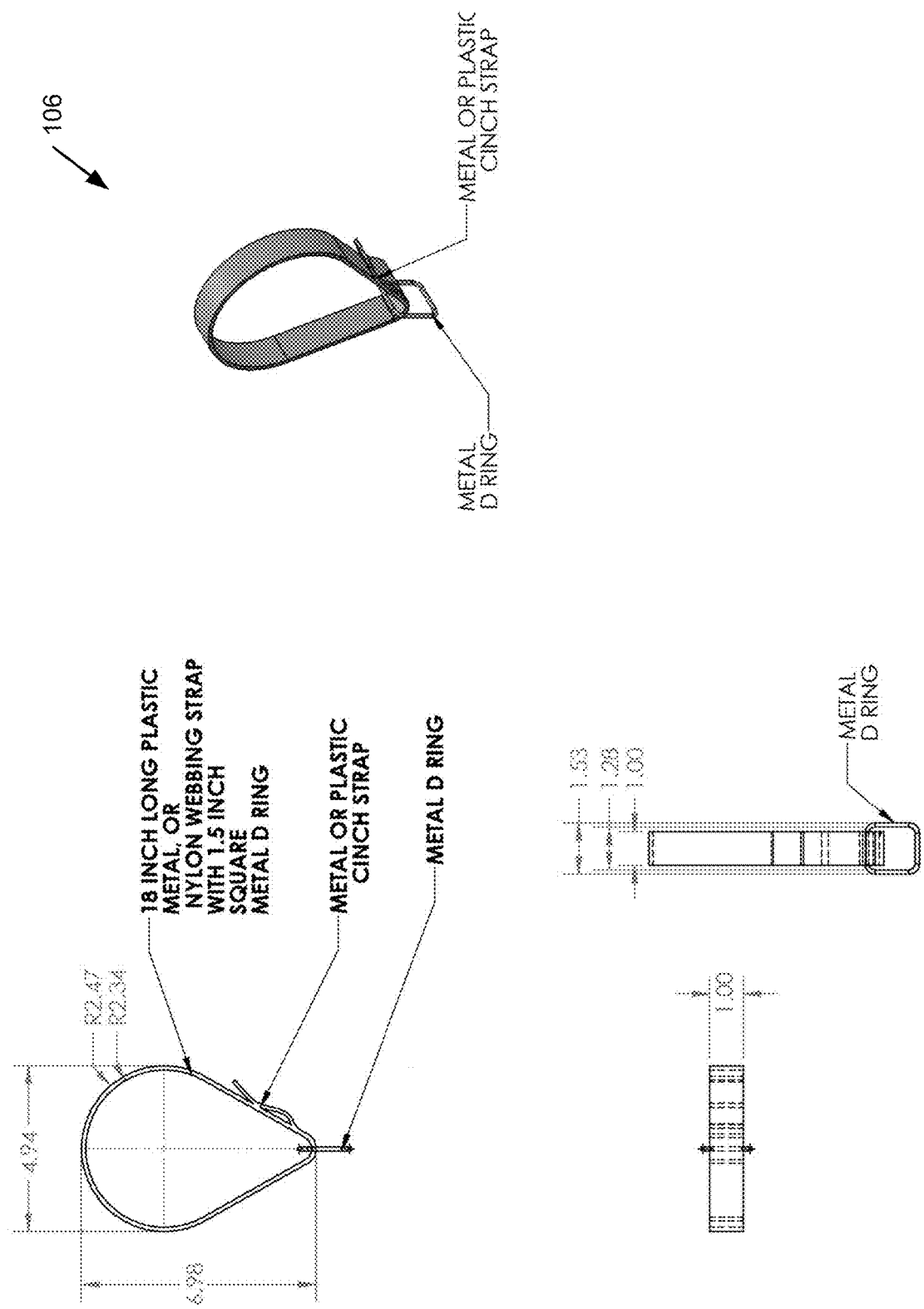
Figure 3H:
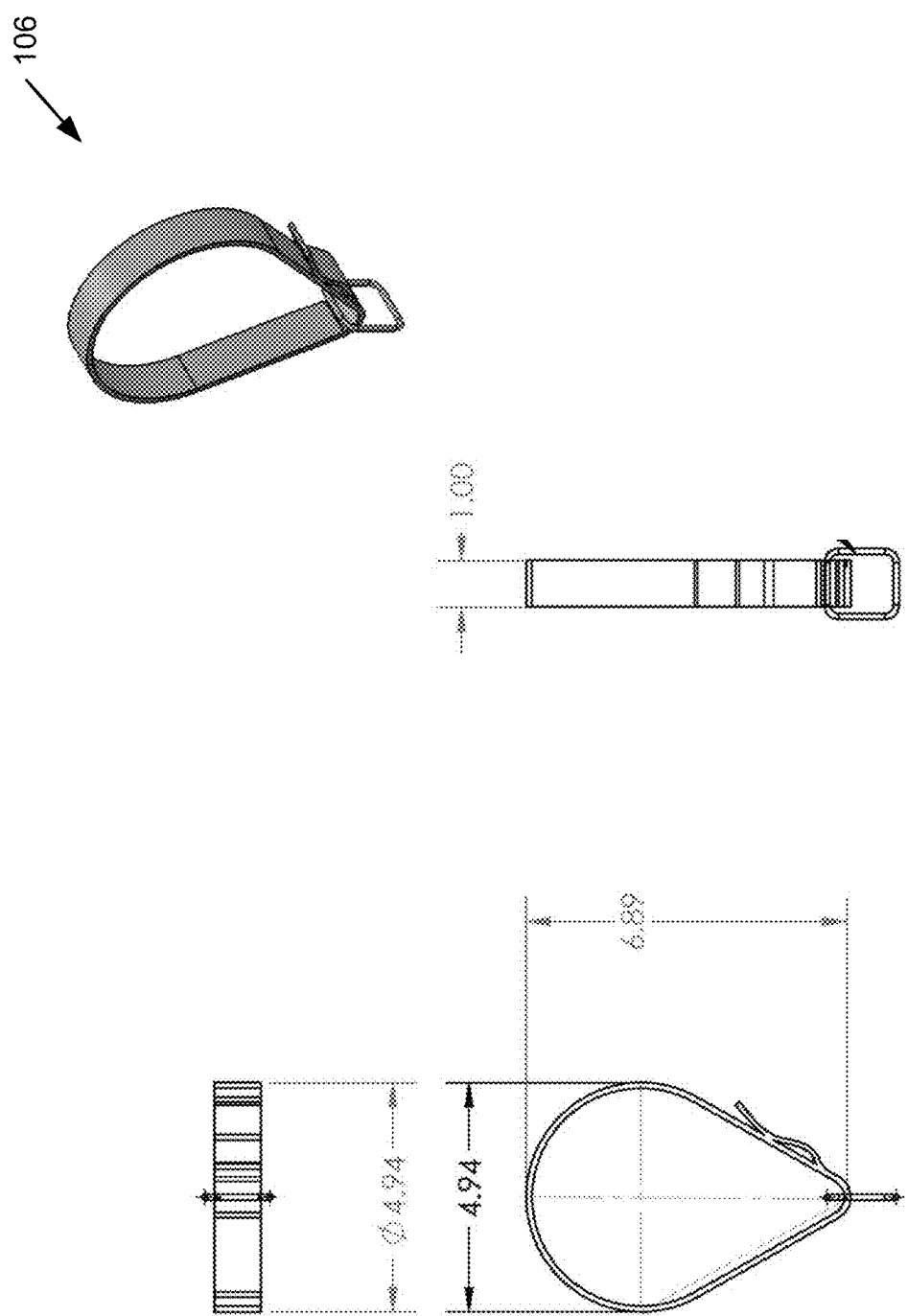
Figure 3I:
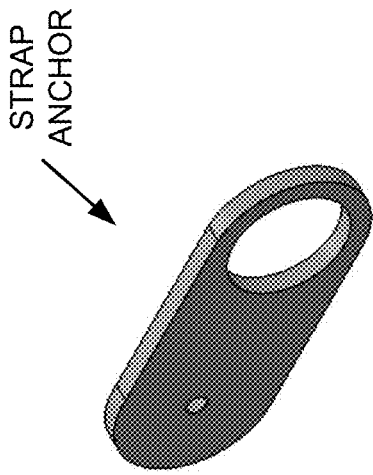
Figure 3I:
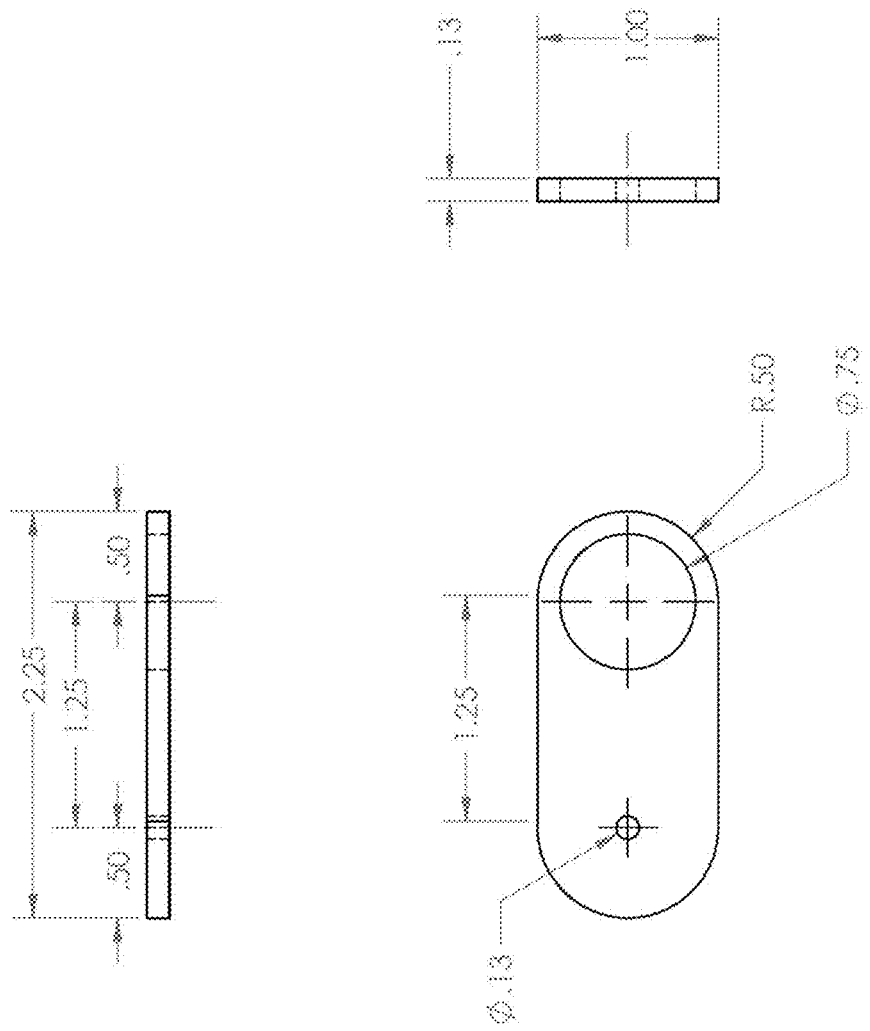

In some implementations, the tube securing straps 106 may comprise any suitable tube securing straps or similar component. For example, in some implementations, the tube securing straps 106 may comprise a ring (e.g., D-ring, O-ring, etc.) strap or a side release belt such as shown in FIGS. 3G and 3H.

In some implementations, the tube securing strap 106 is configured to securely attach the converter tube 102 to the backpack blower 10. For example, in some implementations, the tube securing strap 106 is configured to attach to the backpack blower 10 and also to attach to the converter tube 102.

In some implementations, the tube securing strap 106 is configured to removably attach the converter tube 102 to the backpack blower 10. In some implementations, the tube securing strap 106 is configured to attach the converter tube 102 to the backpack blower 10 in any other suitable manner.

In some implementations, the tube securing strap 106 may be configured to attach to the backpack blower 10 by an adhesive. In some implementations, the tube securing strap 106 may be configured to attach to the backpack blower 10 by a fastener. In some implementations, the tube securing strap 106 may be configured to attach to the backpack blower 10 by any other suitable way.

In some implementations, the tube securing strap 106 may be configured to attach to the converter tube 102 by a hook and loop attachment configuration. In some implementations, the tube securing strap 106 may be configured to attach to the converter tube 102 by a buckle attachment configuration. In some implementations, the tube securing strap 106 may be configured to attach to the converter tube 102 by a closure attachment configuration. In some implementations, the tube securing strap 106 may be configured to attach to the converter tube 102 by any other suitable way.

In some implementations, the tube securing strap 106 may be configured to also securely, removably, and/or otherwise attach the throttle control cable 18 to the backpack blower 10. For example, in some implementations, the tube securing strap 106 may be configured to attach to and route the throttle control cable 18 along with the converter tube 102 on the back and left sides 10e, 10f of the backpack blower 10. In some implementations, the tube securing strap 106 may be configured to attach to and/or route the throttle control cable 18 along with the converter tube 102 in any other suitable configuration.

As introduced above, in some implementations, the backpack blower converter attachment 100 further comprises one or more cable securing straps (not shown). For example, in some implementations, the backpack blower converter attachment 100 comprises a cable securing strap that secures the throttle control cable 18 to the blower back side 10e. In some implementations, the backpack blower converter attachment 100 comprises another cable securing strap that secures the throttle control cable 18 to the blower left side 10f. In some implementations, the backpack blower converter attachment 100 may comprise one or more other cable securing straps that secure the throttle control cable 18 to any other suitable location on the backpack blower 10 respectively.

In some implementations, the cable securing strap is configured to attach the throttle control cable 18 to the backpack blower 10 while the converter tube 102 is attached to the backpack blower 10, as described above, to route the throttle control cable 18 between the backpack blower motor and the throttle control 16.

In some implementations, the cable securing strap is configured to securely attach the throttle control cable 18 to the backpack blower 10. For example, in some implementations, the cable securing strap is configured to attach to the backpack blower 10 and also to attach to the throttle control cable 18.

In some implementations, the cable securing strap is configured to removably attach the throttle control cable 18 to the backpack blower 10. In some implementations, the cable securing strap is configured to attach the throttle control cable 18 to the backpack blower 10 in any other suitable manner.

Similar to the tube securing strap 106 described above, in some implementations, the cable securing strap may be configured to attach to the backpack blower 10 by an adhesive, a fastener, or any other suitable way.

Also similar to the tube securing strap 106 described above, in some implementations, the cable securing strap may be configured to attach to the throttle control cable 18 by a hook and loop attachment configuration, a buckle attachment configuration, a closure attachment configuration, or any other suitable way.

As introduced above, in some implementations, the backpack blower converter attachment 100 may further comprise a replacement tube elbow 120. For example, as shown in FIG. 2A, in some implementations, the backpack blower converter attachment 100 may comprise the replacement tube elbow 120 in place of the original blower tube elbow 20 of the backpack blower 10.

In some implementations, the backpack blower converter attachment 100 may comprise the replacement tube elbow 120 if the original blower tube elbow 20 is not capable to rotate the elbow output opening 20b to a substantially rearward facing direction, as described above, to allow the connection of the converter tube 102.

In some implementations, the backpack blower converter attachment 100 may comprise the replacement tube elbow 120 if the original blower tube elbow 20 is otherwise not compatible, for example in diameter, design, etc., to be connected to the converter tube 102.

In that regard, in some implementations, the replacement tube elbow 120 is configured to be the same or substantially similar to the original blower tube elbow 20. In some implementations, the replacement tube elbow 120 is also configured to rotate the replacement elbow output opening 120b to a substantially rearward facing direction, similar to as described above for the elbow opening 20b, to allow the connection of the converter tube 102.

Furthermore, in some implementations, the replacement tube elbow 120 is configured to be otherwise compatible, for example in diameter, design, etc., to be connected to the converter tube 102.

In some implementations, the replacement tube elbow 120 is configured to securely attach to the blower output port 10b. In some implementations, the replacement tube elbow 120 is configured to removably attach to the blower output port 10b. In some implementations, the replacement tube elbow 120 is configured to attach to the blower output port 10b in any other suitable manner.

In some implementations, the replacement tube elbow 120 is configured to attach to the blower output port 10b by another tube coupling 104.

In some implementations, the backpack blower converter attachment 100 is configured to convert an existing backpack blower 10 from the usual right-handed only use configuration to a left-handed use configuration. In some implementations, the backpack blower converter attachment 100 is configured to quickly convert the existing backpack blower 10. In some implementations, the backpack blower converter attachment 100 is configured to expediently convert the existing backpack blower 10, e.g. with little or no additional changes or preparation to the blower 10.

In some implementations, the backpack blower converter attachment 100 is configured to position the blower tube 12 of an existing backpack blower 10 on the blower left side 10f to be held and aimed with a user's left hand.

In some implementations, the backpack blower converter attachment 100 is configured to securely connect between the blower tube elbow 20 and the blower tube 12 of an existing backpack blower 10. In some implementations, the backpack blower converter attachment 100 is configured to thereby position the blower tube 12 on the blower left side 10f.

In some implementations, the backpack blower converter attachment 100 is configured to removably connect between the blower tube elbow 20 and the blower tube 12 of an existing backpack blower 10.

In some implementations, the backpack blower converter attachment 100 is further configured to replace the blower tube elbow 20 and connect between the blower output port 10b and the blower tube 12 of an existing backpack blower 10.

In some implementations, the backpack blower converter attachment 100 is configured to securely attach to an existing backpack blower 10. In some implementations, the backpack blower converter attachment 100 is configured to removably attach to the existing backpack blower 10.

FIGS. 3A-3I illustrate various manufacturing or production representations of the backpack blower converter attachment 100 described above with respect to FIGS. 2A-2E. In that regard, FIGS. 3A-3I include various example dimensions and/or description notes.

In some implementations, the "hard pipe", "hard pipe assembly", "hard pipe upper", and "hard pipe lower", shown and described in FIGS. 3A-3D correspond to the converter tube 102 described above with respect to FIGS. 2A-2E.

In some implementations, the "clamp" shown and described in FIGS. 3A-3B and 3E-3F corresponds to the tube coupling 104 described above with respect to FIGS. 2A-2E.

In some implementations, the "strap" and "strap anchor" shown and described in FIGS. 3A-3B and 3G-3I correspond to the tube securing strap 106 described above with respect to FIGS. 2A-2E.

Figure 4A:
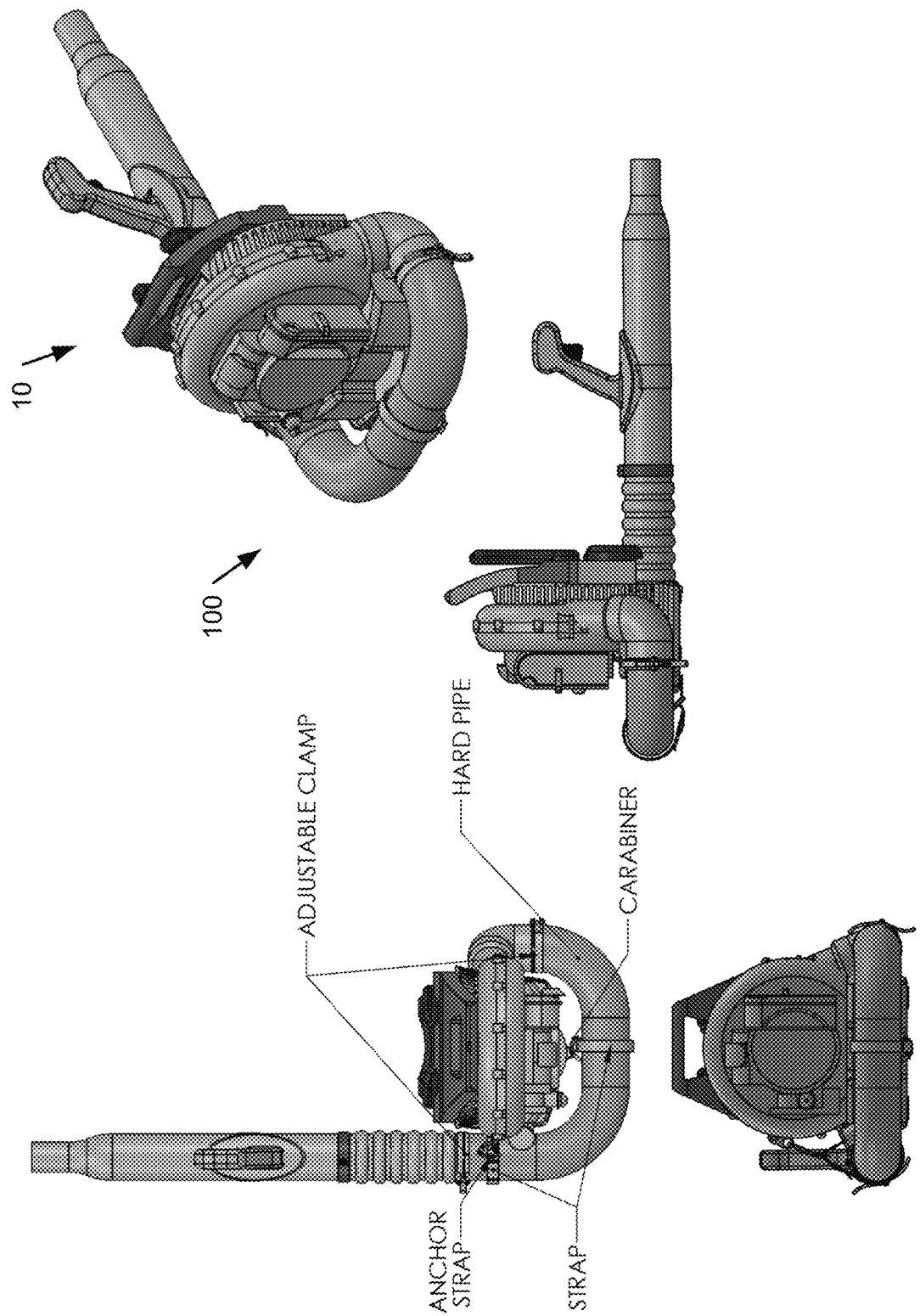
FIGS. 4A and 4B illustrate various manufacturing or production representations of the backpack blower converter attachment connected to an existing backpack blower according to the present disclosure.
Figure 4B:
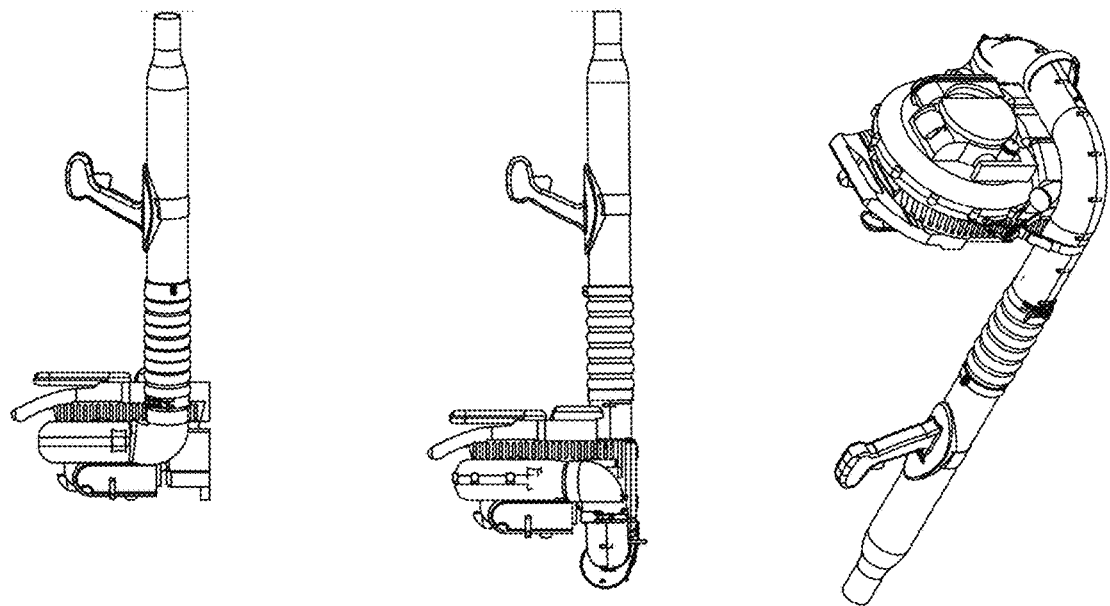
Figure 4B:
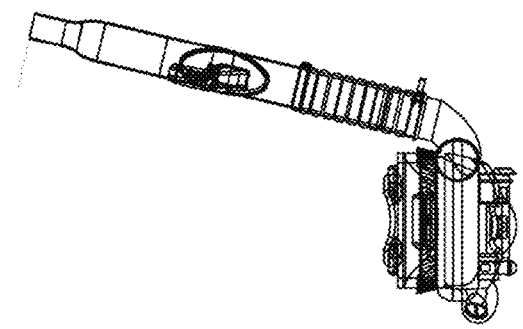
Figure 4B:
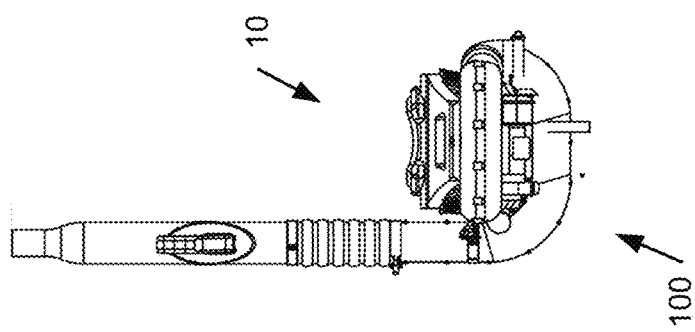

FIGS. 4A and 4B illustrate various manufacturing or production representations of the backpack blower converter attachment 100 connected to an existing backpack blower 10 as described above with respect to FIGS. 2A-2E. FIGS. 4A and 4B include various description notes.

Figure 5:
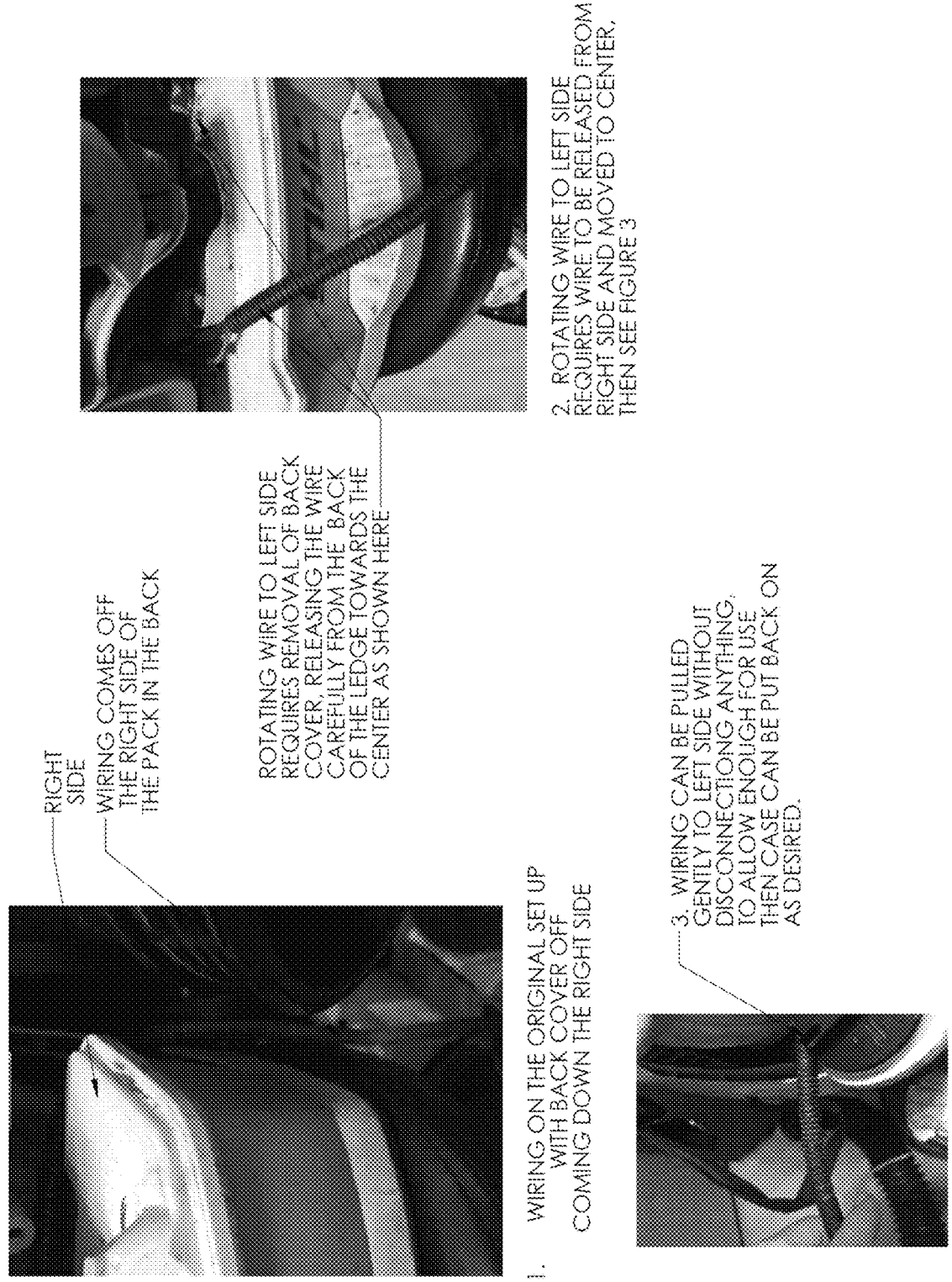
FIG. 5 illustrates various views of an initial preparation and/or configuration of an existing backpack blower for attaching the backpack blower converter attachment according to the present disclosure.

FIG. 5 illustrates various views of an initial preparation and/or configuration of an existing backpack blower 10 for attaching the backpack blower converter attachment 100 described above with respect to FIGS. 2A-2E. FIG. 5 includes various description notes.

A corresponding initial preparation and/or configuration method for attaching the backpack blower converter attachment 100 to an existing backpack blower 10 is described below.

FIGS. 6A-6E illustrate another implementation of an example backpack blower converter attachment 100 (100D) according to the present disclosure. In some implementations, the backpack blower converter attachment 100D is the same or similar, except as further described below, to the backpack blower converter attachment 100 described above for FIGS. 2A-2E, 3A-3I, 4A, and 4B, such as indicated by like-numbered components in the figures.

Figure 6B:
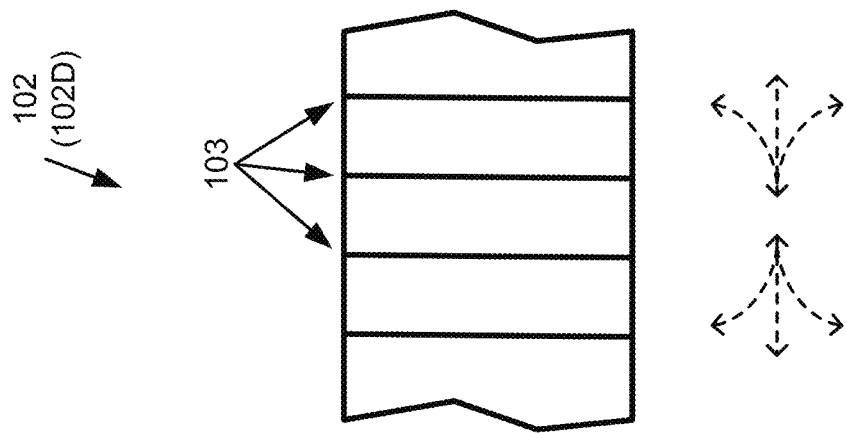
FIGS. 6A-6E illustrate another implementation of an example backpack blower converter attachment according to the present disclosure.
Figure 6A:
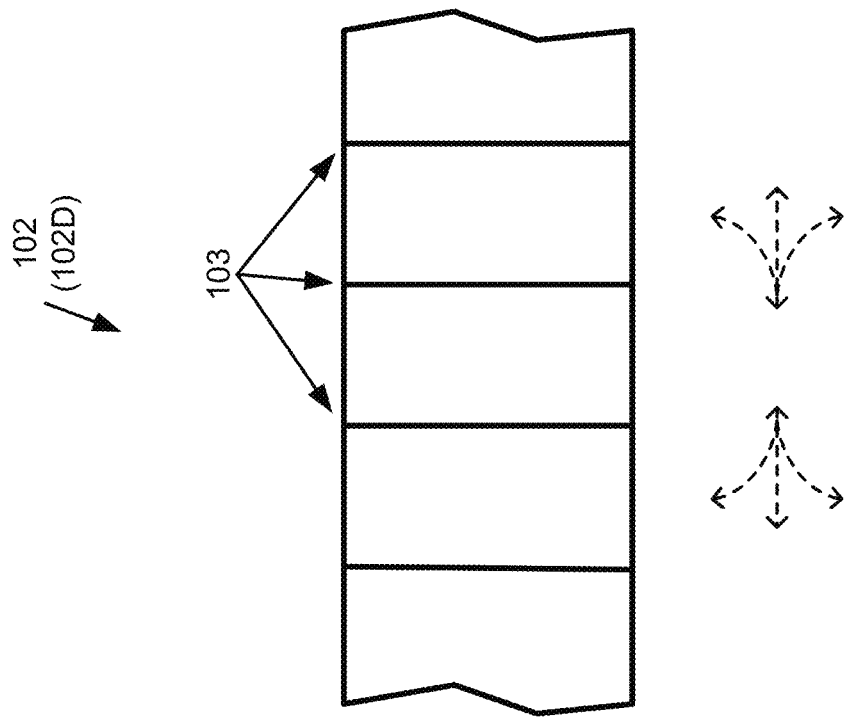
Figure 6D:
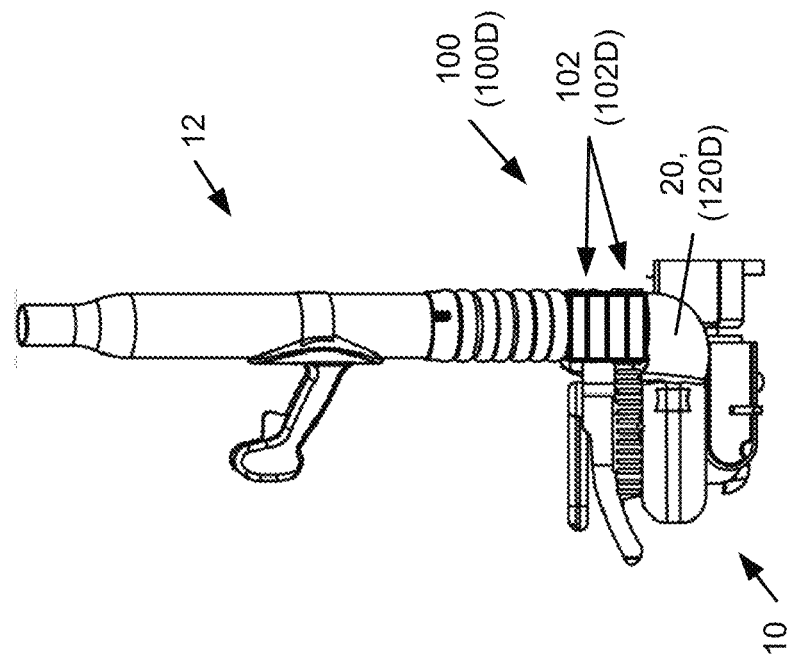
Figure 6C:
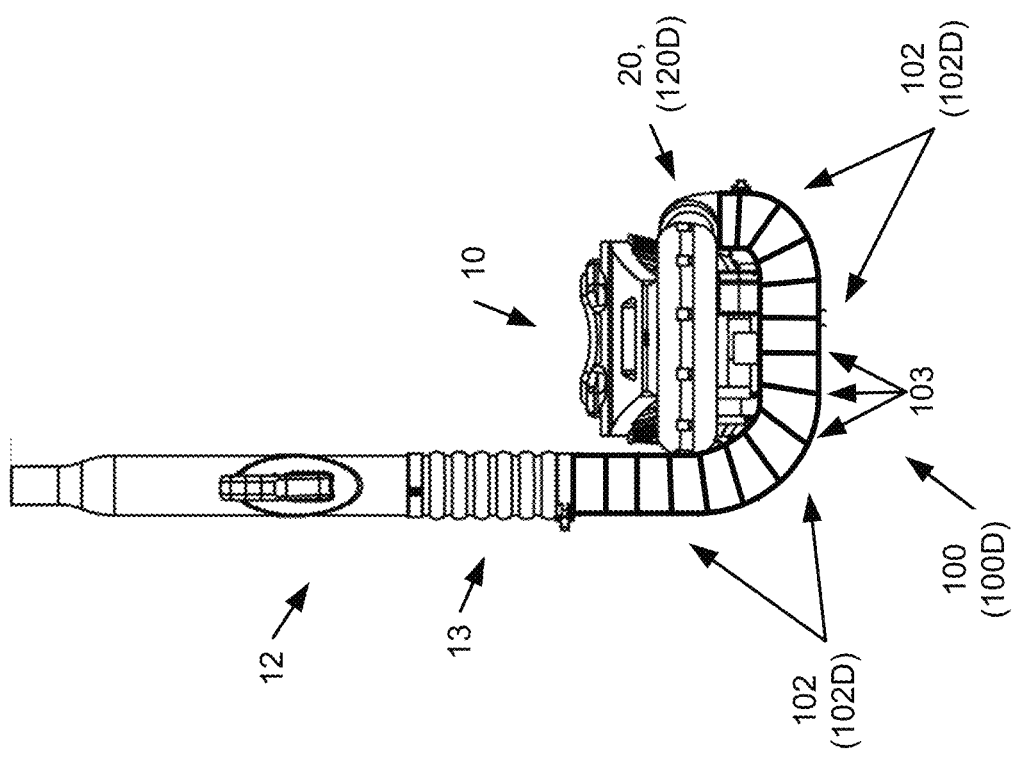

For example, as shown in FIG. 6C, in some implementations, the backpack blower converter attachment 100D comprises a converter tube 102 and may further comprise one or more tube couplings, securing straps, and/or a replacement tube elbow 120D that are generally the same or similar respectively to the above-described converter tube 102, tube couplings 104, securing straps, and replacement tube elbow 120 of the backpack blower converter attachment 100 of FIGS. 2A-2E, 3A-3I, 4A, and 4B.

As shown in FIGS. 6A-6C, in some implementations, the converter tube 102D (102) of the backpack blower converter attachment 100D (100) is configured such that the converter tube 102 is extendable and compressible lengthwise and is also flexibly bendable (e.g., laterally) along the length of the tube 102. As also shown in FIGS. 6A-6C, in some implementations, the converter tube 102D (102) may comprise one or more bellows, pleats, or similar features 113 that allow the tube 102 to be extendable and compressible lengthwise and flexibly bendable (e.g., laterally) along the length of the tube 102.

For example, in some implementations, the converter tube 102 may be generally the same or similar to accordion (or accordion-style) pipe, tube, or hose. In some implementations, the converter tube 102 may be generally the same or similar to expandable pipe, tube, or hose. In some implementations, the converter tube 102 may be generally the same or similar to telescoping pipe, tube, or hose.

As shown in FIG. 6A, in some implementations, the converter tube 102 is extendable lengthwise such that the converter tube 102 expands or stretches to increase in length. As shown in FIG. 6B, in some implementations, the converter tube 102 is compressible lengthwise such that the converter tube 102 compresses or contracts to decrease in length.

In some implementations, the converter tube 102 may be extendable and compressible in length by at least a factor of two. In some implementations, the converter tube 102 may be extendable and compressible in length by at least a factor of about five. For example, in some implementations, the converter tube 102 extendable and compressible in length from about six (6) to eight (8) inches to about thirty (30) inches (or two and one-half {2.5} feet).

In some implementations, the converter tube 102 may be extendable and compressible in length by any other suitable factor, ratio, etc.

As shown in FIG. 6C, in some implementations, the converter tube 102 is flexibly bendable (e.g., laterally) along the length of the tube 102 such that the converter tube 102 can flexibly bend around to one or more sides or other suitable parts of a backpack blower 10. For example, in some implementations, the converter tube 102 can flexibly bend at least ninety degrees.

In some implementations, the converter tube 102 is configured to be extendable, compressible, and flexibly bendable, such as described above, without becoming kinked or otherwise restricted or obstructed to air flowing through the tube 102 for use of the backpack blower 10.

In some implementations, the converter tube 102 may be configured to be normally (e.g., with no user force applied to the tube 102) compressed or partly compressed, such as shown in FIGS. 6B and 6D. In some implementations, the converter tube 102 may be configured to be normally extended or partly extended, such as shown in FIGS. 6A and 6C.

In some implementations, the converter tube 102 may be configured to be normally in any other suitable lengthwise condition.

Figure 6E:
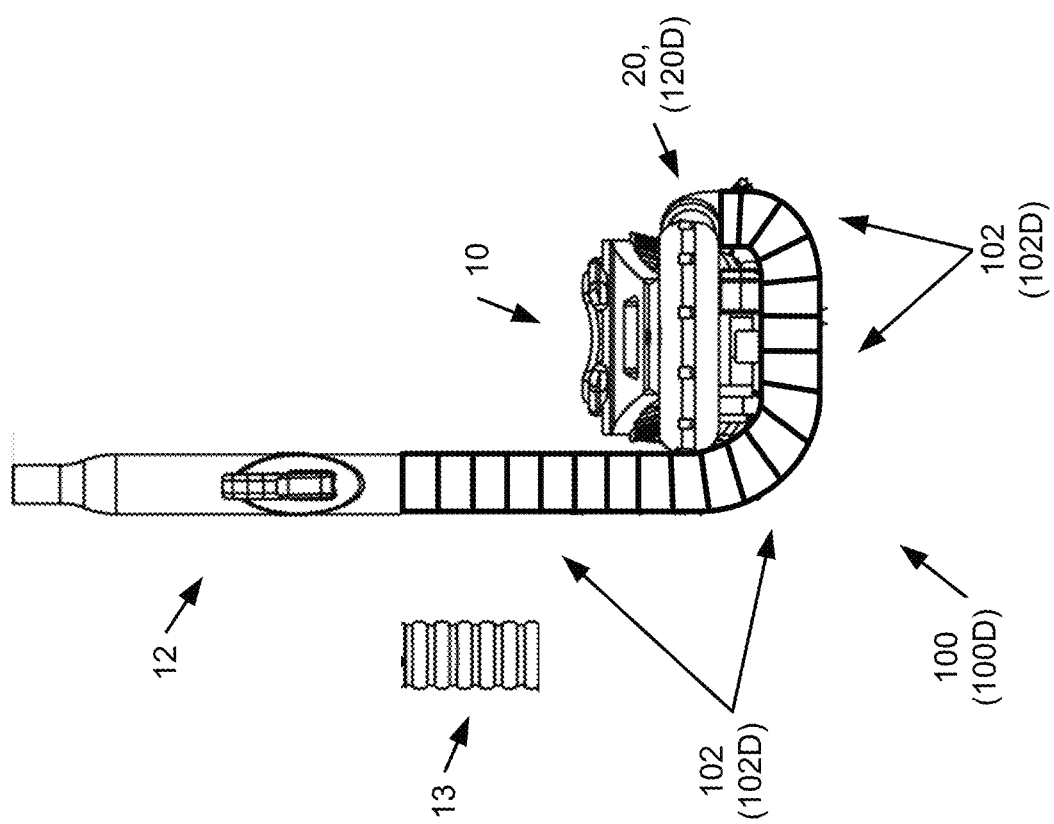

In some implementations, the converter tube 102 may be configured to be normally (e.g., with no user force applied to the tube 102) bent, curved, or generally bent or curved, such as shown in FIGS. 6C and 6E. In some implementations, the converter tube 102 may be configured to be normally in any other suitable laterally bent or curved condition.

In some implementations, the converter tube 102 may be configured to be secured or generally secured in an extended, compressed, and/or bent or curved condition. For example, in some implementations, may comprise one or more features and/or configurations that can secure the converter tube 102 in an extended, compressed, and/or bent or curved condition.

In some implementations, the converter tube 102D (102) of FIGS. 6A-6E may be a lighter weight and/or lightweight in contrast to the converter tube 102 of FIGS. 2A-2E, 3A-3I, 4A, and 4B. For example, in some implementations, the converter tube 102D may be a lighter weight and/or lightweight because of the accordion and/or more flexible configuration described herein.

In some implementations, one or more of the above described features, configurations, etc. of the converter tube 102D and alternates to such features, configurations, etc. will further be apparent to one skilled in the art based on this disclosure.

Similar to the backpack blower converter attachment 100 of FIGS. 2A-2E, 3A-3I, 4A, and 4B, in some implementations, the backpack blower converter attachment 100D (100) of FIGS. 6A-6E is configured to convert an existing backpack blower 10 from a typical right-handed (or left-handed) only use configuration to a left-handed (or right-handed) use configuration. However, in some implementations, the backpack blower converter attachment 100D is further configured to allow the conversion back to the normally right-handed (or left-handed) only use configuration from the converted left-handed (or right-handed) use configuration while keeping the backpack blower converter attachment 100D attached and in use to the backpack blower 10 (i.e., without the removal of the backpack blower converter attachment 100D).

For example, as shown in FIG. 6C, in some implementations, the backpack blower converter attachment 100D is configured to convert the hand-use side (e.g., from right to left) of a backpack blower 10 by the attached and extended converter tube 102D. Furthermore, as shown in FIG. 6D, in some implementations, the backpack blower converter attachment 100D is configured to convert the backpack blower 10 back to the normal hand-use side (e.g., from left back to right) by the still attached but compressed converter tube 102D.

Additionally, as shown in FIG. 6E, in some implementations, the backpack blower converter attachment 100D may be configured to convert the hand-use side of a backpack blower 10 (and also to convert back the hand-use side) by the converter tube 102D attached to the blower tube 12 of the backpack blower 10 without the pleated hose portion 13 (i.e., with the pleated hose portion 13 disconnected and removed from the blower tube 12).

Furthermore, in some implementations, the backpack blower converter attachment 100D may be configured to convert the hand-use side of a backpack blower 10 (and also to convert back the hand-use side) by the converter tube 102D attached (e.g., rotateably) to the output port 10b of the backpack blower 10 without the blower tube elbow 20 or the replacement elbow 120D (i.e., with the blower tube elbow 20 disconnected and removed from the blower output port 10b).

In some implementations, the backpack blower converter attachment 100D (100) of FIGS. 6A-6E may be a lighter weight and/or lightweight in contrast to the backpack blower converter attachment 100 of FIGS. 2A-2E, 3A-3I, 4A, and 4B. For example, in some implementations, the backpack blower converter attachment 100D may be a lighter weight and/or lightweight because of the accordion and/or more flexible configuration described herein.

In some implementations, one or more of the above described features, configurations, etc. of the backpack blower converter attachment 100D and alternates to such features, configurations, etc. will further be apparent to one skilled in the art based on this disclosure.

In some implementations, the backpack blower converter attachment 100 comprises any suitable dimensions, such as the example dimensions shown in FIGS. 3C-3I.

In some implementations, the backpack blower converter attachment 100 is composed of any suitable materials. For example, in some implementations, the converter tube 102 may be composed of a plastic or metal material.

In some implementations, the backpack blower converter attachment 100 can have any suitable appearance, such as the example appearances shown in the figures.

In some implementations, an example method of using the backpack blower converter attachment 100, with respect to the components described above for the respective figures, comprises disconnecting the blower tube 12 from the blower tube elbow 20 of an existing backpack blower 10.

In some implementations, the method comprises rotating the blower tube elbow 20 to a substantially rearward facing direction, i.e. toward the back side 10e of the backpack blower 10.

In some implementations, the method comprises connecting the converter tube 102 to the blower tube elbow 20.

In some implementations, the method comprises positioning the converter tube 102 to extend from the connection to the blower tube elbow 20 along the blower right side 10d, along the blower back side 10e, and along the blower left side 10f. In some implementations, the converter tube 102 is so extended so that the output opening 102b is substantially forward facing on the blower left side 10f, i.e. facing the direction of the blower front side 10g.

In some implementations, the method comprises connecting the blower tube 12 to the converter tube 102, thereby positioning the blower tube 12 on the blower left side 10f to convert the backpack blower 10 from the usual right-handed only use configuration to a left-handed use configuration.

In some implementations, the method further comprises securing the converter tube 102 to one or more sides 10e, 10f of the backpack blower 10 by one or more respective tube securing straps 106.

In some implementations, the method further comprises securing the throttle control cable 18 to one or more sides 10e, 10f of the backpack blower 10 by the one or more respective tube securing straps 106 or by one or more respective cable securing straps (not shown).

In some implementations, the method further comprises replacing the original blower tube elbow 20 of the backpack blower 10 with the replacement tube elbow 120.

In some implementations, to convert the backpack blower 10 back to the usual right-handed use configuration, the method further comprises disconnecting the blower tube 12 from the converter tube 102. In some implementations, the method comprises disconnecting the converter tube 102 from the blower tube elbow 20 and removing the converter tube 102 from extending along the blower sides 10d, 10e, 10f.

In some implementations, the method comprises rotating the blower tube elbow 20 back to a substantially forward facing direction and connecting the blower tube 12 to the elbow 20 to thereby convert the backpack blower 10 back to the usual right-handed use configuration.

In some implementations, the above described connections, attachments, etc. made in the method of using the backpack blower converter attachment 100 are made according to the respective corresponding configurations described above, i.e. with respect to the input openings, output openings, etc.

In some implementations, the above described connections made in the method of using the backpack blower converter attachment 100 are made with the respective one or more tube couplings 104 described above.

In some implementations, an initial preparation and/or configuration method for attaching the backpack blower converter attachment 100 to an existing backpack blower 10 comprises removing the pull-starter assembly 24 of the backpack blower 10. In some implementations, removing the pull-starter assembly 24 comprises removing one or more securing screws of the cover 22 and removing one or more securing screws of the pull-starter assembly 24.

In some implementations, the method comprises removing the cover 22.

In some implementations, the method comprises detaching the original securing attachment of the throttle control cable 18 to the backpack blower 10, such as on the blower right side 10e and/or back side 10f. In some implementations, detaching the original securing attachment comprises detaching the throttle control cable 18 from one or more original securing clamps (not shown) of the backpack blower 10.

In some implementations, the method comprises routing the detached throttle control cable 18 above or otherwise adjacent to the fuel container 26 along the blower back side 10e.

In some implementations, the method comprises securing the detached, rerouted throttle control cable 18 to the blower back side 10e by one or more respective cable securing straps or tube securing straps 106.

In some implementations, the method comprises replacing the cover 22 to the backpack blower 10, including by replacing any applicable securing screws.

In some implementations, the method comprises replacing the pull-starter assembly 24 to the backpack blower 10, including by replacing any applicable securing screws.

In some implementations, the backpack blower 10 is thereby initially prepared and/or configured for connecting the backpack blower converter attachment 100 to the backpack blower 10, such as according the previous method described above.

In some implementations, the above described methods of using the backpack blower converter attachment 100 of respective FIGS. 2A-2E, 3A-3I, 4A, 4B, and 5 are the same or similar to methods of using the backpack blower converter attachment 100D of FIGS. 6A-6E, except the methods may further comprise extending, compressing, and/or flexibly bending the converter tube 102 based on the above descriptions.

In some implementations, the methods of using the backpack blower converter attachment 100D of FIGS. 6A-6E may further comprise leaving the backpack blower converter attachment 100D (e.g., the converter tube 102D and/or other suitable components thereof) connected and/or attached to convert a backpack blower 10 back to the normal hand-side configuration (e.g., by compressing the converter tube 102D and further configuring the backpack blower converter attachment 100D such as shown in FIG. 6D).

In some implementations, other additional or alternate steps, features, etc. for the methods of using the backpack blower converter attachment 100D of FIGS. 6A-6E will further be apparent to one skilled in the art based on this disclosure.

The figures, including photographs and drawings, comprised herewith may represent one or more implementations of the backpack blower converter attachment.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A backpack blower converter attachment comprising:
   an extension tube comprising a first end and a second end, wherein:
   the first end of the extension tube is sized and shaped to removably connect to a blower tube elbow positioned on a first side of a backpack blower, wherein an input end of the blower tube elbow is connected to an air output port of the backpack blower;
   the second end of the extension tube is sized and shaped to connect to an input end of a blower tube of the backpack blower; and
   the extension tube is sized to extend from the blower tube elbow on the first side of the backpack blower to a second side of the backpack blower such that when the extension tube is connected to the blower tube elbow and the blower tube of the backpack blower, the backpack blower is converted from the blower tube being utilized by the user on the first side of the backpack blower to the blower tube being utilized by the user on the second side of the backpack blower.

2. The backpack blower converter attachment of claim 1 wherein the extension tube is rigid.

3. The backpack blower converter attachment of claim 1 wherein the extension tube is extendable and compressible lengthwise and bendable laterally along a length of the extension tube such that the extension tube is capable of being:
   extended in length and bent laterally such that the extension tube extends from the blower tube elbow on the first side of the backpack blower to a second side of the backpack blower such that when the extension tube is connected to the blower tube elbow and the blower tube of the backpack blower, the backpack blower is converted from the blower tube being utilized by the user on the first side of the backpack blower to the blower tube being utilized by the user on the second side of the backpack blower; and compressed in length such that when the extension tube is connected to the blower tube elbow and the blower tube of the backpack blower, the blower tube is capable of being utilized by the user on the first side of the backpack blower.

4. The backpack blower converter attachment of claim 1 wherein the extension tube comprises an accordion shape that allows the extension tube to extend and compress lengthwise and bend laterally along the length of the extension tube.

5. The backpack blower converter attachment of claim 1 wherein:
the backpack blower is a right-handed backpack blower;
the first side is the right-hand side of the backpack blower; and
the second side is the left-hand side of the backpack blower.

6. The backpack blower converter attachment of claim 1 further comprising:
a first pipe clamp sized and shaped to secure a connection of the first end of the extension tube to the blower tube elbow of the backpack blower; and
a second pipe clamp sized and shaped to secure a connection of the second end of the extension tube to the blower tube of the backpack blower.

7. The backpack blower converter attachment of claim 6 wherein the first pipe clamp and the second pipe clamp are adjustable quick release pipe clamps.

8. The backpack blower converter attachment of claim 1 further comprising a strap, wherein the strap is sized and shaped to attach to the backpack blower and to the extension tube such that the strap stabilizes the extension tube when connected to the blower tube elbow and the blower tube of the backpack blower.

9. The backpack blower converter attachment of claim 8 wherein the strap is a side release belt.

10. The backpack blower converter attachment of claim 1 further comprising an elbow tube comprising a first end and a second end, wherein:
the first end of the elbow tube is sized and shaped to rotateably connect to the air output port of the backpack blower such that the elbow tube can at least partly rotate at the connection when connected to the air output port of the backpack blower;
the second end of the elbow tube is sized and shaped to connect to the first end of the extension tube;
the elbow tube is sized and shaped to extend from the air output port of the backpack blower to the extension tube when the elbow tube is connected to the air output port of the backpack blower and to the extension tube and:
when the extension tube extends from the first side to the second side of the backpack blower and is connected to the blower tube; and
alternately when the extension tube extends along the first side of the backpack blower toward the front side of the backpack blower and is connected to the blower tube; and
the elbow tube can rotateably connect to the air output port of the backpack blower such that the second end of the elbow tube can move at least partly toward the back side of the backpack blower and at least partly toward the front side of the backpack blower when the elbow tube is connected to the air output port of the backpack blower.

11. A method of using the backpack blower converter attachment of claim 1 comprising:
disconnecting the input end of the blower tube of a backpack blower from the output end of the blower tube elbow of the backpack blower;
connecting the first end of the extension tube to the output end of the blower tube elbow of the backpack blower; and
connecting the second end of the extension tube to the input end of the blower tube of the backpack blower such that the extension tube extends from the first side to the second side of the backpack blower;
wherein the backpack blower is converted from the blower tube being utilized by the user on the first side of the backpack blower to the blower tube being utilized by the user on the second side of the backpack blower.

12. The method of claim 11 wherein the backpack blower is a right-handed backpack blower and whereby connecting the extension tube to the blower tube elbow and the blower tube of the backpack blower converts the backpack blower to a left-handed backpack blower.

13. The method of claim 12 wherein the extension tube is extendable and compressible lengthwise and bendable laterally along a length of the extension tube, the method further comprising compressing the extension tube from along the second side of the backpack blower to back along the first side of the backpack blower such that the backpack blower is converted back to a right-handed backpack blower.

14. A method of using the backpack blower converter attachment of claim 10 comprising:
disconnecting the blower tube elbow and the blower tube of a backpack blower from the air output port of the backpack blower;
connecting the first end of the elbow tube to the air output port of the backpack blower;
rotating the elbow tube such that the second end of the elbow tube is moved toward the back side of the backpack blower;
connecting the second end of the elbow tube to the first end of the extension tube; and
connecting the second end of the extension tube to the input end of the blower tube of the backpack blower such that the extension tube extends from the first side to the second side of the backpack blower;
wherein the backpack blower is converted from the blower tube being utilized by the user on the first side of the backpack blower to the blower tube being utilized by the user on the second side of the backpack blower.

15. The method of claim 14 wherein the backpack blower is a right-handed backpack blower and whereby connecting the elbow tube to the air output port and the extension tube and connecting the extension tube to the blower tube converts the backpack blower to a left-handed backpack blower.

16. The method of claim 15 wherein the extension tube is extendable and compressible lengthwise and bendable laterally along a length of the extension tube, the method further comprising:
compressing the extension tube from along the second side of the backpack blower to back along the first side of the backpack blower; and
rotating the elbow tube such that the second end of the elbow tube is moved toward the front side of the backpack blower;
whereby the backpack blower is converted back to a right-handed backpack blower.

17. A method of using the backpack blower converter attachment of claim 1 comprising:

disconnecting the input end of the blower tube of a backpack blower that includes a pleated hose portion of the blower tube from the output end of the blower tube elbow of the backpack blower;

disconnecting the pleated hose portion from the blower tube of the backpack blower;

connecting the first end of the extension tube to the output end of the blower tube elbow of the backpack blower; and connecting the second end of the extension tube to the input end of the blower tube of the backpack blower without the pleated hose portion of the blower tube such that the extension tube extends from the first side to the second side of the backpack blower;

wherein the backpack blower is converted from the blower tube being utilized by the user on the first side of the backpack blower to the blower tube being utilized by the user on the second side of the backpack blower.

18. The method of claim 17 wherein the backpack blower is a right-handed backpack blower and whereby connecting the extension tube to the blower tube elbow and the blower tube of the backpack blower converts the backpack blower to a left-handed backpack blower.

19. The method of claim 18 wherein the extension tube is extendable and compressible lengthwise and bendable laterally along a length of the extension tube, the method further comprising compressing the extension tube from along the second side of the backpack blower to back along the first side of the backpack blower such that the backpack blower is converted back to a right-handed backpack blower.

\* \* \* \* \*